United States Patent
Torii et al.

(10) Patent No.: US 9,321,309 B2
(45) Date of Patent: Apr. 26, 2016

(54) MANUFACTURING METHOD FOR A BEARING DEVICE FOR A WHEEL

(71) Applicants: Akira Torii, Shizuoka (JP); Hiroshi Kawamura, Shizuoka (JP); Kiyoshige Yamauchi, Shizuoka (JP); Masahiro Ozawa, Shizuoka (JP); Tohru Nakagawa, Shizuoka (JP); Yuichi Asano, Shizuoka (JP); Mitsuru Umekida, Shizuoka (JP); Hisaaki Kura, Shizuoka (JP); Shin Tomogami, Shizuoka (JP)

(72) Inventors: Akira Torii, Shizuoka (JP); Hiroshi Kawamura, Shizuoka (JP); Kiyoshige Yamauchi, Shizuoka (JP); Masahiro Ozawa, Shizuoka (JP); Tohru Nakagawa, Shizuoka (JP); Yuichi Asano, Shizuoka (JP); Mitsuru Umekida, Shizuoka (JP); Hisaaki Kura, Shizuoka (JP); Shin Tomogami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/665,177
(22) Filed: Mar. 23, 2015

(65) Prior Publication Data
US 2015/0197121 A1    Jul. 16, 2015

Related U.S. Application Data

(63) Continuation of application No. 14/269,508, filed on May 5, 2014, now Pat. No. 9,039,286, which is a continuation of application No. 12/530,834, filed as application No. PCT/JP2008/054660 on Mar. 13, 2008, now Pat. No. 8,757,887.

(30) Foreign Application Priority Data

Mar. 22, 2007 (JP) ................................ 2007-075103
May 17, 2007 (JP) ................................ 2007-131813
May 17, 2007 (JP) ................................ 2007-131815
May 29, 2007 (JP) ................................ 2007-142492
Jun. 6, 2007 (JP) ................................ 2007-150736

(51) Int. Cl.
B60B 27/00  (2006.01)
F16C 19/18  (2006.01)
(Continued)

(52) U.S. Cl.
CPC ......... *B60B 27/0078* (2013.01); *B60B 27/0005* (2013.01); *B60B 27/0042* (2013.01);
(Continued)

(58) Field of Classification Search
CPC ............ B60B 27/0078; B60B 27/0042; B60B 27/0084; B60B 27/0005; B60B 27/0094; B60B 2310/316; B60B 2380/12; F16C 35/063; F16C 19/186; F16C 33/64; F16C 35/0635; F16C 2326/02; Y10T 29/49536; Y10T 403/7021; Y10T 403/7026
See application file for complete search history.

(56) References Cited

U.S. PATENT DOCUMENTS

| 4,376,333 A | 3/1983 | Kanamaru et al. |
| 4,768,995 A | 9/1988 | Mangiavacchi |

(Continued)

FOREIGN PATENT DOCUMENTS

| JP | 55-1924 | 1/1980 |
| JP | 64-015511 | 1/1989 |

(Continued)

OTHER PUBLICATIONS

International Search Report dated Jun. 3, 2008 for International Application No. PCT/JP2008/054660.
(Continued)

*Primary Examiner* — Ryan J Walters
(74) *Attorney, Agent, or Firm* — Wenderoth, Lind & Ponack, L.L.P.

(57) ABSTRACT

A bearing device for a wheel prevents backlash in a circumferential direction and has excellent workability for connecting a hub wheel and an outer joint member of a constant velocity universal joint. The bearing device includes a recess-projection fitting structure in which the hub wheel and a shaft section, which is fitted in a hole of the hub wheel of the outer joint member of the constant velocity universal joint, are unitized together. In the recess-projection fitting structure, entire fitting regions among projections on the outer surface of the shaft section of the outer joint member and recesses, which fit on the projections, are brought into intimate contact with each other.

1 Claim, 17 Drawing Sheets

(51) Int. Cl.
*F16C 33/64* (2006.01)
*F16C 35/063* (2006.01)

(52) U.S. Cl.
CPC ......... *B60B27/0084* (2013.01); *B60B 27/0094* (2013.01); *F16C 19/186* (2013.01); *F16C 33/64* (2013.01); *F16C 35/063* (2013.01); *F16C 35/0635* (2013.01); *B60B 2310/316* (2013.01); *B60B 2380/12* (2013.01); *F16C 2326/02* (2013.01); *Y10T 29/49536* (2015.01); *Y10T 403/7021* (2015.01); *Y10T 403/7026* (2015.01)

(56) References Cited

U.S. PATENT DOCUMENTS

| | | | |
|---|---|---|---|
| 5,536,098 | A | 7/1996 | Schwarzler |
| 6,135,571 | A | 10/2000 | Mizukoshi et al. |
| 6,286,909 | B1 | 9/2001 | Mizukoshi et al. |
| 6,488,789 | B2 | 12/2002 | Tajima et al. |
| 6,749,517 | B2 | 6/2004 | Ouchi |
| 6,800,033 | B2 | 10/2004 | Ouchi |
| 6,974,259 | B2 | 12/2005 | Nomura et al. |
| 8,757,887 | B2 | 6/2014 | Torii et al. |
| 2002/0153520 | A1 | 10/2002 | Samejima |
| 2002/0195291 | A1 | 12/2002 | Nonogaki |
| 2003/0002762 | A1 | 1/2003 | Kamura et al. |
| 2004/0037482 | A1 | 2/2004 | Ouchi |
| 2004/0134252 | A1 | 7/2004 | Knoerr et al. |
| 2005/0094912 | A1 | 5/2005 | Ouchi |
| 2005/0163410 | A1 | 7/2005 | Sakamoto |
| 2006/0023984 | A1 | 2/2006 | Terada et al. |
| 2006/0213288 | A1 | 9/2006 | Suzuki |
| 2007/0253653 | A1 | 11/2007 | Shigeoka et al. |
| 2008/0277999 | A1 | 11/2008 | Song et al. |

FOREIGN PATENT DOCUMENTS

| | | |
|---|---|---|
| JP | 2-29262 | 8/1990 |
| JP | 06-074229 | 3/1994 |
| JP | 06-312322 | 11/1994 |
| JP | 06-312323 | 11/1994 |
| JP | 07-167152 | 7/1995 |
| JP | 11-062951 | 3/1999 |
| JP | 2000-006610 | 1/2000 |
| JP | 2000-142009 | 5/2000 |
| JP | 2001-001709 | 1/2001 |
| JP | 2001-105806 | 4/2001 |
| JP | 2002-178706 | 6/2002 |
| JP | 2002-205504 | 7/2002 |
| JP | 2003-13981 | 1/2003 |
| JP | 2003-056572 | 2/2003 |
| JP | 2003-065316 | 3/2003 |
| JP | 2004-322834 | 11/2004 |
| JP | 2004-340311 | 12/2004 |
| JP | 2004-352051 | 12/2004 |
| JP | 2005-193757 | 7/2005 |
| WO | 2004/026630 | 4/2004 |

OTHER PUBLICATIONS

International Preliminary Report on Patentability and Written Opinion of the International Searching Authority dated Oct. 1, 2009 for International Application No. PCT/JP2008/054660.
Japanese Office Action issued Nov. 5, 2012 in corresponding Japanese Application No. 2007-142492 with partial English translation.
Japanese Office Action issued Nov. 5, 2012 in corresponding Japanese Application No. 2007-150736 with partial English translation.

MANUFACTURING METHOD FOR A BEARING DEVICE FOR A WHEEL

CROSS REFERENCE TO RELATED APPLICATIONS

This is a continuation of U.S. application Ser. No. 14/269,508, filed May 5, 2014, which is a continuation of U.S. application Ser. No. 12/530,834, now U.S. Pat. No. 8,757,887, which is a U.S. National Stage of International (PCT) Application No. PCT/JP2008/054660, filed Mar. 13, 2008.

TECHNICAL FIELD

The present invention relates to a bearing device for a wheel for supporting wheels to freely rotate relative to a vehicle body in a vehicle such as an automobile.

BACKGROUND ART

The bearing device for a wheel has evolved from a structure called first generation in which roller bearings in double rows are independently used to second generation in which a vehicle body attachment flange is integrally provided in an outer member. Further, third generation in which one inner raceway surface of the roller bearings in double rows is integrally formed with an outer circumference of a hub wheel integrally having a wheel attachment flange has been developed. Further, fourth generation in which a constant velocity universal joint is integrated with the hub wheel and the other inner raceway surface of the roller bearings in double rows is integrally formed with an outer circumference of an outer joint member constituting the constant velocity universal joint has been developed.

For example, the bearing device for a wheel called third generation is described in Patent Document 1. The bearing device for a wheel called third generation includes, as illustrated in FIG. 22, a hub wheel 102 having a flange 101 extending in an outer diameter direction, a constant velocity universal joint 104 having an outer joint member 103 fixed to this hub wheel 102, and a roller bearing having an outer member 105 arranged on an outer circumferential side of the hub wheel 102.

The constant velocity universal joint 104 includes the outer joint member 103, an inner joint member 108 arranged in a cup-shaped section 107 of this outer joint member 103, a ball 109 arranged between this inner joint member 108 and the outer joint member 103, and a cage 110 that retains this ball 109. A spline section 111 is formed on an inner circumferential surface of a center hole of the inner joint member 108. An end spline section of a shaft (not shown) is inserted into this center hole, whereby the spline section 111 on the inner joint member 108 side and the spline section on the shaft side are engaged.

Further, the hub wheel 102 includes a cylinder section 113 and the flange 101. A short-cylindrical pilot section 115, on which a wheel and a brake rotor (not shown) are mounted, is protrudingly provided on an outer end surface 114 (end surface on an opposite joint side) of the flange 101. Note that, the pilot section 115 includes a large-diameter first section 115a and a small-diameter second section 115b. The brake rotor is externally fitted onto the first section 115a, and the wheel is externally fitted onto the second section 115b.

Then, a notch section 116 is provided in an outer circumferential surface at an end portion on the cup-shaped section 107 side of the cylinder section 113. An inner race 117 is fitted in this notch section 116. A first inner raceway surface 118 is provided near a flange on an outer circumferential surface of the cylinder section 113 of the hub wheel 102. A second inner raceway surface 119 is provided on an outer circumferential surface of the inner race 117. Further, a bolt inserting hole 112 is provided in the flange 101 of the hub wheel 102. A hub bolt for fixing the wheel and the brake rotor to this flange 101 is inserted into this bolt inserting hole 112.

In the outer member 105 of the roller bearing, double-row outer raceway surfaces 120, 121 are provided on an inner circumference thereof, and a flange (vehicle body attachment flange) 132 is provided on an outer circumference thereof. A first outer raceway surface 120 of the outer member 105 and the first inner raceway surface 118 of the hub wheel 102 are opposed to each other. A second outer raceway surface 121 of the outer member 105 and the raceway surface 119 of the inner race 117 are opposed to each other. Rolling elements 122 are interposed between those inner and outer raceway surfaces. That is, an inner member of the roller bearing is constituted by the inner race 117 and a part of the outer surface of the hub wheel 102.

A shaft section 123 of the outer joint member 103 is inserted into the cylinder section 113 of the hub wheel 102. In the shaft section 123, a screw section 124 is formed at an end of a reverse cup-shaped section thereof. A spline section 125 is formed between this screw section 124 and the cup-shaped section 107. Further, a spline section 126 is formed in an inner circumferential surface (inner surface) of the cylinder section 113 of the hub wheel 102. When this shaft section 123 is inserted into the cylinder section 113 of the hub wheel 102, the spline section 125 on the shaft section 123 side and the spline section 126 on the hub wheel 102 side are engaged.

A nut member 127 is screwed onto the screw section 124 of the shaft section 123 projecting from the cylinder section 113. The hub wheel 102 and the outer joint member 103 are connected. An inner end surface (rear surface) 128 of the nut member 127 and an outer end surface 129 of the cylinder section 113 come into contact with each other and an end surface 130 on the shaft section side of the cup-shaped section 107 and an outer end surface 131 of the inner race 117 come into contact with each other. In other words, when the nut member 127 is tightened, the hub wheel 102 is nipped by the nut member 127 and the cup-shaped section 107 through an intermediation of the inner race 117.

CITATION LIST

Patent Literature

[Patent Document 1] JP 2004-340311 A

SUMMARY OF INVENTION

Technical Problem

Conventionally, as described above, the spline section 125 on the shaft section 123 side and the spline section 126 on the hub wheel 102 side are engaged. Therefore, it is necessary to apply spline machining to both the shaft section 123 side and the hub wheel 102 side, and hence cost increases. When the shaft section 123 is press-fitted into the hub wheel 102, recesses and projections of the spline section 125 on the shaft section 123 side and the spline section 126 on the hub wheel 102 side need to be aligned. In this case, if the shaft section 123 is press-fitted into the hub wheel 102 by aligning tooth surfaces thereof, recessed and projected teeth are likely to be damaged (torn). Further, if the shaft section 123 is press-fitted into the hub wheel 102 by aligning the spline sections to a large diameter of the recessed and projected teeth rather than aligning the tooth surfaces, a backlash in a circumferential direction tends to occur. As described above, if there is the backlash in the circumferential direction in this way, transferability of rotation torque is low and noise tends to occur. Therefore, when the shaft section 123 is press-fitted into the hub wheel 102 by the spline fitting as in the prior art, it is difficult to solve both the damages to the recessed and projected teeth and the backlash in the circumferential direction.

Further, it is necessary for the nut member 127 to be screwed on the screw section 124 of the shaft section 123 projecting from the cylinder section 113. Thus, the assembly work involves screw fastening operation, resulting in a rather poor workability.

Further, the number of components is large, resulting in a rather poor component controllability.

Thus, in recent years, as a method for fastening the outer joint member 103 of the constant velocity universal joint 104 and the hub wheel 102, there is proposed a method in which projections, which are provided on one of the outer surface of the shaft section 123 of the outer joint member 103 and the inner surface of the hole of the hub wheel 102 so as to extend in an axial direction, are press-fitted to another one of the outer surface and the inner surface along the axial direction, and recesses, which intimately fit on the projections, are formed in another one of the outer surface and the inner surface by the projections, whereby a recess-projection fitting structure is realized and the constant velocity universal joint and the hub wheel are integrated with each other. With this structure, it is possible to omit nut fastening work for integrating the hub wheel 102 and the constant velocity universal joint 104 with each other.

In the adhesion fitting method, the shaft section 123 as an inner component is press-fitted into the hub wheel 102 as an outer component, and hence the hub wheel 102 and the inner race 117 expand. This expansion generates hoop stress on the raceway grooves (bearing raceway surfaces) 118, 119, an inner race shoulder section 117a, a section 133 between the raceway grooves, and an inner race small-diameter outer section 134 of components. Here, the hoop stress means force for expanding a diameter in the outer diameter direction. Therefore, excessive hoop stress causes trouble with the bearing. When the hoop stress is generated on the bearing raceway surfaces 118, 119, there is a risk that the hoop stress reduces rolling fatigue life and causes occurrence of a crack. Further, the hoop stress is generated on the inner race 117 at a stage of press-fitting to the hub wheel 102 with interference, and hence the hoop stress tends to be generated particularly on the second inner raceway surface 119 and the inner race shoulder section 117a. When the hoop stress is generated on the inner race 117, there is a risk that stress corrosion crack occurs due to an influence of rust on the end surface portion exposed to outside.

As described above, if a large backlash occurs in a joint section between the hub wheel and the constant velocity universal joint or inside the constant velocity universal joint, noise, vibration, and harshness (NVH) (which are three factors for indicating comfortability of a vehicle) characteristics of a vehicle are deteriorated. Accordingly, in recent years, in order to improve the NVH characteristics, a demand for elimination of such a backlash is further required.

Further, in this bearing device for a wheel, at the time of assembly of the vehicle, the outer member of the roller bearing is internally fitted in a knuckle. In this case, the outer member and the knuckle are normally integrated together by bolt fastening. Therefore, a backlash easily occurs in the region fastened by the bolt.

In view of the above-mentioned problems, an object of the present invention is to provide a bearing device for a wheel that can realize prevention of a backlash in a circumferential direction and is excellent in workability of connection of a hub wheel and an outer joint member of a constant velocity universal joint. It is another object of the present invention to provide a bearing device for a wheel that can allow omission of nut fastening work and cost reduction, reduce generation of hoop stress, and prevent occurrence of trouble with a bearing. It is still another object of the present invention to provide a bearing device for a wheel that can prevent deterioration in NVH characteristics, which is caused by a backlash occurring in a joint section between the hub wheel and the constant velocity universal joint or between an outer member and a knuckle, and can perform rotation torque transmission with high accuracy.

Solution to Problems

A first bearing device for a wheel according to the present invention includes: a hub wheel; a constant velocity universal joint; and a double-row roller bearing comprising: an outer member having an inner circumference in which double-row outer raceway surfaces are formed; an inner member including the hub wheel having an outer circumference in which one of inner raceway surfaces opposed to the double-row outer raceway surfaces is provided, and an inner race externally fitted onto the hub wheel and having an outer circumference in which another one of the inner raceway surfaces opposed to the double-row outer raceway surfaces is formed; and balls accommodated in double rows between both the raceway surfaces of the inner member and the outer member so as to freely roll, the hub wheel, the double-row roller bearing, and the constant velocity universal joint being unitized together, wherein a recess-projection fitting structure, in which the hub wheel and a shaft section of an outer joint member of the constant velocity universal joint are integrated with each other, is provided, the recess-projection fitting structure being configured such that projections, which are provided on one of an outer surface of the shaft section of the outer joint member and an inner surface of a hole of the hub wheel so as to extend in an axial direction, are press-fitted to another one of the outer surface and the inner surface along the axial direction, and that recesses, which intimately fit on the projections, are formed in another one of the outer surface and the inner surface by the projections, and that entire regions of fitting contact regions between the projections and the recesses are brought into intimate contact with each other, and wherein fitting between the inner race and a small diameter step section in a range corresponding to an outer surface side of the recess-projection fitting structure is non-interference fitting, and the fitting between the inner race and the small diameter step section in another range is interference fitting. Here, the interference fitting means fitting always involving interference in combination. Further, the non-interference fitting means transition fitting or loose fitting. Further, the transition fitting means fitting involving a gap or interference in combination due to actual dimensions of a hole and a shaft, and means fitting in which tolerance zones of the hole and the shaft entirely or partially overlap each other. The loose fitting means fitting always involving a gap in combination.

According to the first bearing device for a wheel of the present invention, in the recess-projection fitting structure, the entire fitting contact regions between the projections and the recesses are brought into intimate contact with each other.

Therefore, in this fitting structure, a gap in which a backlash occurs is not formed in a diameter direction and a circumferential direction.

Further, the fitting between the inner race and the small diameter step section in the range corresponding to the outer surface side of the recess-projection fitting structure is non-interference fitting, and hence it is possible to suppress at minimum generation of hoop stress of the inner race in the range corresponding to the outer surface side of the recess-projection fitting structure. The fitting between the inner race and the small diameter step section in another range corresponding to the outer surface side of the recess-projection fitting structure is interference fitting, and hence it is possible to prevent creep of the inner race. Here, the creep means a phenomenon of relative shift between fitting surfaces, which occurs when the bearing slightly moves in the circumferential direction because of insufficiency of the interference, machining accuracy failure of the fitting surfaces, or the like and a gap is generated between the fitting surfaces.

A circumferential notch section is formed in the inner surface of the inner race in the range corresponding to the outer surface side of the recess-projection fitting structure, whereby the non-interference fitting may be performed. A circumferential notch section is formed in the outer surface of the small diameter step section, whereby the non-interference fitting may be performed.

There may be adopted a bearing device for a wheel in which a hub wheel, a double-row roller bearing, and a constant velocity universal joint are unitized together, and which has a recess-projection fitting structure, in which the hub wheel and a shaft section of an outer joint member of the constant velocity universal joint are integrated with each other. In the bearing device for a wheel, the recess-projection fitting structure may be configured such that projections, which are provided on one of an outer surface of the shaft section of the outer joint member and an inner surface of a hole of the hub wheel so as to extend in an axial direction, are press-fitted to another one of the outer surface and the inner surface along the axial direction, and that recesses, which intimately fit on the projections, are formed in another one of the outer surface and the inner surface by the projections, and that entire regions of fitting contact regions between the projections and the recesses are brought into intimate contact with each other, and the double-row roller bearing includes the outer member having the raceway surfaces at its inner circumference, the outer member being connected to a knuckle constituting a suspension device through an intermediation of an integral connection structure of a non-separation type.

According to such a bearing device for a wheel, as in the case of the first bearing device for a wheel, in the recess-projection fitting structure, the entire fitting contact regions between the projections and the recesses are brought into intimate contact with each other. Therefore, in this fitting structure, a gap in which a backlash occurs is not formed in a diameter direction and a circumferential direction. Further, the knuckle constituting the suspension device is connected to the outer member through an intermediation of the integral connection structure of the non-separation type, and hence a backlash does not occur between the outer member and the knuckle. The integral connection structure may be configured by caulking at least one of the knuckle and the outer member, by caulking a caulked member interposed between the knuckle and the outer member, or by welding the knuckle and the outer member together.

The projections of the recess-projection fitting structure are provided to the shaft section of the outer joint member of the constant velocity universal joint, and the recesses, which intimately fit on the projections, are formed by the projections in the inner surface of the hole of the hub wheel by setting at least hardness of axial end portions of the projections to be higher than that of an inner surface portion of the hole of the hub wheel, and by press-fitting the shaft section into the hole of the hub wheel from a side of the axial end portions of the projections, whereby the recess-projection fitting structure may be configured. In this case, the projections bite in the recess formation surface of the opposite member (inner surface of hole of hub wheel), whereby the hole is slightly expanded in diameter and allows movement in the axial direction of the projections. If the movement in the axial direction stops, the hole decreases in diameter to return to the original diameter. Thus, the entire recess fitting regions of the projections are brought into intimate contact to the corresponding recesses.

Further, the projections of the recess-projection fitting structure are provided on the inner surface of the hole of the hub wheel, and the recesses, which intimately fit on the projections, are formed by the projections in the outer surface of the shaft section of the outer joint member by setting at least hardness of axial end portions of the projections to be higher than that of an outer surface portion of the shaft section of the outer joint member of the constant velocity universal joint, and by press-fitting the projections on a side of the hub wheel to the shaft section of the outer joint member from a side of the axial end portions of the projections, whereby the recess-projection fitting structure may be configured. The projections bite in the outer surface of the shaft section, whereby the hole of the hub wheel is slightly expanded in diameter and allows movement in the axial direction of the projections. If the movement in the axial direction stops, the hole decreases in diameter to return to the original diameter. Thus, the entire regions of the fitting contact regions between the projections and the recesses of the opposite member (outer surface of shaft), which fit on the projections, are brought into intimate contact with each other.

A second bearing device for a wheel according to the present invention includes: a hub wheel; a double-row roller bearing; and a constant velocity universal joint, the hub wheel, the double-row roller bearing, and the constant velocity universal joint being unitized together, in which a recess-projection fitting structure, in which the hub wheel and a shaft section of an outer joint member of the constant velocity universal joint which is fitted and inserted into a hole of the hub wheel are integrated with each other, is provided, the recess-projection fitting structure being configured such that entire regions of fitting contact regions between projections on an outer surface of the shaft section of the outer joint member and recesses, which fit on the projections, in an inner surface of the hub wheel are brought into intimate contact with each other, and in which a hardened layer by induction hardening is formed on an outer surface side of the hub wheel, and an inner surface side of the hub wheel is left in an unhardened state.

According to the second bearing device for a wheel according to the present invention, as in the case of the first bearing device for a wheel, in the recess-projection fitting structure, the entire fitting contact regions between the projections and the recesses are brought into intimate contact with each other. Therefore, in this fitting structure, a gap in which a backlash occurs is not formed in a diameter direction and a circumferential direction. Further, the inner surface side of the hub wheel is left in the unhardened state, and hence the inner surface side of the hub wheel is relatively soft. Therefore, it is possible to realize improvement of fittability in fitting the projections on the outer surface of the shaft section of the outer joint member into the recesses in the inner surface of the hole of the hub wheel.

The hardened layer on the outer surface of the hub wheel is formed by, for example, induction hardening. Here, the induction hardening is a hardening method employing the principle of inserting a section necessary to be hardened into a coil through which a high-frequency current flows, generating Joule heat with an electromagnetic induction action, and heating a conductive substance. That is, if the induction hardening is performed, the surface can be hard and its inside can be kept in hardness of a material. Therefore, the inner surface side of the hub wheel can be maintained in the unhardened state. In contrast, if there is used carburizing which is often used for performing hardening treatment on each region of the constant velocity universal joint, there is a risk that the inner surface side is also hardened. That is, the carburizing is a method of causing carbon to intrude/spread from the surface of a low carbon material and performing hardening thereafter. Even if anti-carburizing treatment is performed, the inner surface side contains a certain amount of carbon and is hardened to about 400 HV.

Further, there may be adopted a bearing device for a wheel in which a hub wheel, a double-row roller bearing, and a constant velocity universal joint are unitized together, and which includes a recess-projection fitting structure, in which the hub wheel and a shaft section of an outer joint member of the constant velocity universal joint which is fitted and inserted into a hole of the hub wheel are integrated with each other. In the bearing device for a wheel, the recess-projection fitting structure may be configured such that, by press-fitting the shaft section of the outer joint member in a state of heating and expanding in diameter the hole of the hub wheel, the entire regions of the fitting contact regions between the projections on the outer surface of the shaft section of the outer joint member and the recesses, which fit on the projections, in the inner surface of the hub wheel are brought into intimate contact with each other.

According to such a bearing device for a wheel, as in the case of the first bearing device for a wheel, in the recess-projection fitting structure, the entire fitting contact regions between the projections and the recesses are brought into intimate contact with each other. Therefore, in this fitting structure, a gap in which a backlash occurs is not formed in a diameter direction and a circumferential direction. Further, the shaft section of the outer joint member is press-fitted in the state of heating and expanding in diameter the hole of the hub wheel, and hence the hole of the hub wheel decreases in diameter due to a decrease in temperature. In this case, a shape of the projections on the outer surface of the shaft section is transferred onto the inner surface of the hub wheel. That is, the projections bite in the inner surface of the hub wheel, and this heating state is canceled. As a result, the hole decreases in diameter to return to the original diameter. Accordingly, the entire regions of the fitting contact regions between the projections and the recesses are brought into intimate contact with each other.

It is preferred to set a heating expanding temperature to be lower than a guaranteed temperature for components of the bearing device for a wheel. Here, the guaranteed temperature is a temperature at which there can be exerted functions of the components (sealing, grease, cage, encoder, and the like) used in the bearing device for a wheel. If the heating expanding temperature is lower than this temperature, the functions of the components are not deteriorated.

Moreover, there may be adopted a bearing device for a wheel in which a hub wheel, a double-row roller bearing, and a constant velocity universal joint are unitized together, and which includes a recess-projection fitting structure, in which the hub wheel and a shaft section of an outer joint member of the constant velocity universal joint which is fitted and inserted into a hole of the hub wheel are integrated with each other. In the bearing device for a wheel, the recess-projection fitting structure may be configured such that a tapered section for centering, which decreases in diameter along a press-fitting direction, is formed to the hole of the hub wheel, and that the shaft section of the outer joint member is press-fitted into the hole of the hub wheel through an intermediation of the tapered section, and that the entire regions of the fitting contact regions between the projections on the outer surface of the shaft section of the outer joint member and the recesses, which fit on the projections, in the inner surface of the hub wheel are brought into intimate contact with each other.

According to such a bearing device for a wheel, as in the case of the first bearing device for a wheel, in the recess-projection fitting structure, the entire fitting contact regions between the projections and the recesses are brought into intimate contact with each other. Therefore, in this fitting structure, a gap in which a backlash occurs is not formed in a diameter direction and a circumferential direction. Further, the tapered section for centering, which decreases in diameter along the press-fitting direction, is formed to the hole of the hub wheel. Accordingly, when the shaft section of the outer joint member is press-fitted into the hole of the hub wheel, the tapered section for centering can constitute a guide at the start of press-fitting.

It is preferred to provide a collar section for centering (cylindrical surface section for centering) having a diameter equal to or slightly smaller than the hole diameter of the hole of the hub wheel at the forward end of the shaft section of the outer joint member. When the collar section is provided, it is possible to press-fit the shaft section into the hub wheel while preventing decentering.

It is preferred to provide a pocket section that stores an extruded portion caused by the recess formation by the press-fitting on the shaft section. Here, the extruded portion is equivalent to a volume of a material in the recesses in which the recess fitting regions of the projections are fitted. The extruded portion includes the material extruded from the recesses to be formed, the material cut for forming the recesses, or the material extruded and cut.

Further, projecting direction intermediate regions of the projections correspond to a position of a recess forming surface of the hole of the hub wheel before recess formation. In this case, an inner diameter dimension of the inner surface of the hole of the hub wheel is set to be smaller than a maximum diameter dimension of a circle connecting vertexes of the projections, and to be larger than a maximum diameter dimension of the recesses in the outer surface of the shaft section among the projections.

It is preferred to set circumferential thicknesses of projecting direction intermediate regions of the projections to be smaller than circumferential dimensions in positions corresponding to the intermediate regions in between the projections adjacent to one another in a circumferential direction. By this setting, a sum of the circumferential thicknesses of the projecting direction intermediate regions of the projections is set to be smaller than a sum of circumferential thicknesses in positions corresponding to the intermediate regions in the projections on an opposite side that fit in between the projections adjacent to one another in the circumferential direction.

It is preferred to provide recess-projection portions along the axial direction to at least the axial part of the member provided with the projections. The recess-projection portions can be formed into a serrate shape.

The outer joint member of the constant velocity universal joint comprises a mouth section in which an inner joint member is mounted, and the shaft section provided so as to project from a bottom portion of the mouth section, and, by caulking an end portion of the hub wheel, preload is applied to the roller bearing through an intermediation of the inner race of the roller bearing which is externally fitted onto the hub wheel, and the mouth section is out of contact with the end portion of the hub wheel.

Advantageous Effects of Invention

According to the present invention, in the recess-projection fitting structure, a gap in which a backlash occurs is not formed in a diameter direction and a circumferential direction. Thus, the entire fitting regions contribute to rotation torque transmission, and stable torque transmission is possible. In addition, noise is not caused. Moreover, the entire fitting regions are brought into intimate contact with each other with no gap, and hence strength of torque transmission regions is increased. Therefore, the bearing device for a wheel can be reduced in weight and size.

Further, the fitting between the inner race and the small diameter step section in the range corresponding to the outer surface side of the recess-projection fitting structure is non-interference fitting, and hence it is possible to suppress at minimum generation of hoop stress of the inner race in the range corresponding to the outer surface side of the recess-projection fitting structure. Thus, it is possible to prevent occurrence of a trouble with a bearing such as a reduction in rolling fatigue life, occurrence of a crack, and stress corrosion crack, and to provide a high-quality bearing device for a wheel.

The fitting between the inner race and the small diameter step section in another range corresponding to the outer surface side of the recess-projection fitting structure is interference fitting, and hence it is possible to prevent creep. That is, it is possible to prevent the creep which is a phenomenon of relative shift between fitting surfaces, to secure stable fitting of the inner race, and to provide a high-quality bearing device for a wheel. Further, a circumferential notch section is formed in the inner surface of the inner race in the range corresponding to the outer surface side of the recess-projection fitting structure, whereby the non-interference fitting may be formed. A circumferential notch section is formed on the outer surface of the small diameter step section, whereby the non-interference fitting may be formed. As a result, it is possible to form a gap between the inner race and the small diameter step section in this range, and to more reliably suppress the generation of hoop stress. Further, when the circumferential notch section is formed on the inner surface of the inner race, processing for forming the non-interference fitting on the hub wheel side is unnecessary, and there is an advantage that the existing bearing device can be used. When the circumferential notch section is formed on the outer surface of the small diameter step section, the processing for forming the non-interference fitting on the inner race side is unnecessary, and there is an advantage that the existing bearing device can be used.

The knuckle is connected to the outer member through an intermediation of the integral connection structure of the non-separation type, and hence a backlash does not occur between the outer member and the knuckle. In addition, the outer member and the knuckle are integrated with each other, and hence it is possible to realize simplification (facilitation) of assembly work in vehicle assembly plants. As described above, it is possible to reduce a backlash occurring on a joint section between the hub wheel and the constant velocity universal joint, and to eliminate a backlash between the outer member and the knuckle. Thus, it is possible to realize improvement of the NVH characteristics of a vehicle which uses this bearing device for a wheel.

The inner surface side of the hub wheel is relatively soft. Therefore, it is possible to realize improvement of fittability (adhesiveness) in fitting the projections on the outer surface of the shaft section of the outer joint member in the recesses in the inner surface of the hole of the hub wheel. It is possible to accurately suppress a backlash from occurring in the diameter direction and the circumferential direction. Moreover, the hardened layer is formed on the outer surface side of the hub wheel, and hence it is possible to realize improvement of strength and durability of the hub wheel. In particular, the hardened layer is formed by the induction hardening, whereby hardening on the inner surface side is prevented and the unhardened state on the inner surface side is stably secured.

By press-fitting the shaft section of the outer joint member in a state of heating and expanding in diameter the hole of the hub wheel, the recess-projection fitting structure can be configured reliably. The heating expanding temperature is set to be lower than the guaranteed temperature for components of the bearing device for a wheel. Accordingly, sealing, grease, and the like used in the bearing device for a wheel can exert their functions effectively, and a quality of the bearing device for a wheel can be guaranteed.

The tapered section for centering can constitute a guide at the start of press-fitting. Thus, it is possible to press-fit the shaft section of the outer joint member into the hole of the hub wheel without causing decentering to thereby perform stable torque transmission. In particular, when the collar section for centering (cylindrical surface section for centering) is provided, it is possible to press-fit the shaft section into the hub wheel while preventing decentering, and hence more stable press-fitting is possible.

The projections of the recess-projection fitting structure are provided in the shaft portion of the outer joint member of the constant velocity universal joint, the hardness of the axial ends of the projections is set to be higher than that of the inner surface portion of the hole of the hub wheel, and the shaft portion is press-fitted in the hole of the hub wheel from the axial end side. As a result, it is possible to increase the hardness on the shaft portion side and improve the rigidity of the shaft portion by heat treatment. The projections of the recess-projection fitting structure are provided on the inner surface of the hole of the hub wheel, the hardness of the axial ends of the projections is set to be higher than that of the outer surface portion of the shaft portion of the outer joint member of the constant velocity universal joint, and the projections on the hub wheel side are press-fitted in the shaft portion of the outer joint member from the axial end side thereof. As a result, it is unnecessary to perform hardness treatment (heat treatment) on the shaft portion side. Therefore, the outer joint member of the constant velocity joint is excellent in productivity.

By providing the pocket section for storing the extruded portion caused by recess formation by the press-fitting, it is possible to hold (maintain) the extruded portion in this pocket. The extruded portion does not enter the inside of the vehicle and the like on the outside of the device. In other words, it is possible to keep the extruded portion stored in the pocket section, it is unnecessary to perform removal processing for the extruded portion, and it is possible to realize a reduction in assembly work man-hour and realize improvement of assembly workability and cost reduction.

By providing the collar section for centering with the hole of the hub wheel on the opposite projection side in the axial direction of the pocket section, ejection of the extruded portion in the pocket section to the collar section side is eliminated. The extruded portion is more stably stored. Moreover, the collar section is used for centering, and hence it is possible to press-fit the shaft portion into the hub wheel while preventing decentering. Therefore, it is possible to highly accurately connect the outer joint member and the hub wheel and perform stable torque transmission.

Further, any regions in a projecting direction of the projections are arranged on a recess forming surface before recess formation, whereby the projections bite in the recess forming surface during press-fitting. As a result, it is possible to reliably form the projections.

By setting the circumferential thicknesses of the projecting direction intermediate regions of the projections to be smaller than the dimensions in positions corresponding to the intermediate regions in between the projections adjacent to one another in the circumferential direction, it is possible to increase the circumferential thicknesses of the projecting direction intermediate regions of the projections on the side in which the recesses are formed (projections among the formed recesses). Therefore, it is possible to increase a shearing area of the projections on the opposite side (projections having low hardness between the recesses because the recesses are formed) and secure torsion strength. Moreover, tooth thicknesses of the projections on the high hardness side are small, and hence it is possible to reduce press-fitting load and realize improvement of press-fitting properties.

By providing recess-projection portions on a side of the projections, the recess-projection portions bite into a member having smaller hardness (member provided with the recesses in which the projections fit) along the axial direction during press-fitting. Owing to this biting-in, it is possible to form slipping-off in the axial direction of the outer joint member of the constant velocity universal joint with respect to the hub wheel. Thus, it is possible to maintain a stable connected state, and to realize improvement of a quality of the bearing device for a wheel. In addition, slipping-off can be formed by the recess-projection portions, and hence screw fastening in the prior art can be omitted. Therefore, it is unnecessary to form, in the shaft section, a screw section projecting from the hole of the hub wheel. It is possible to realize a reduction in weight, to omit screw fastening work, and to realize improvement of assembly workability.

A mouth section is out of contact with the end portion of the hub wheel, and hence it is possible to prevent generation of noise due to contact between the mouth section and the hub wheel. Note that, if it is possible to suppress the generation of noise, the mouth section and a caulked section of the hub wheel may be held in contact with each other. Further, the end portion of the hub wheel is caulked and preload is applied to the roller bearing, and hence it is unnecessary to apply the preload to the roller bearing by the mouth section of the outer joint member. Thus, without taking the preload to the roller bearing into consideration, it is possible to press-fit the shaft section of the outer joint member, and to realize improvement of connectability (assemblability) between the hub wheel and the outer joint member.

DESCRIPTION OF EMBODIMENTS

Figure 1:
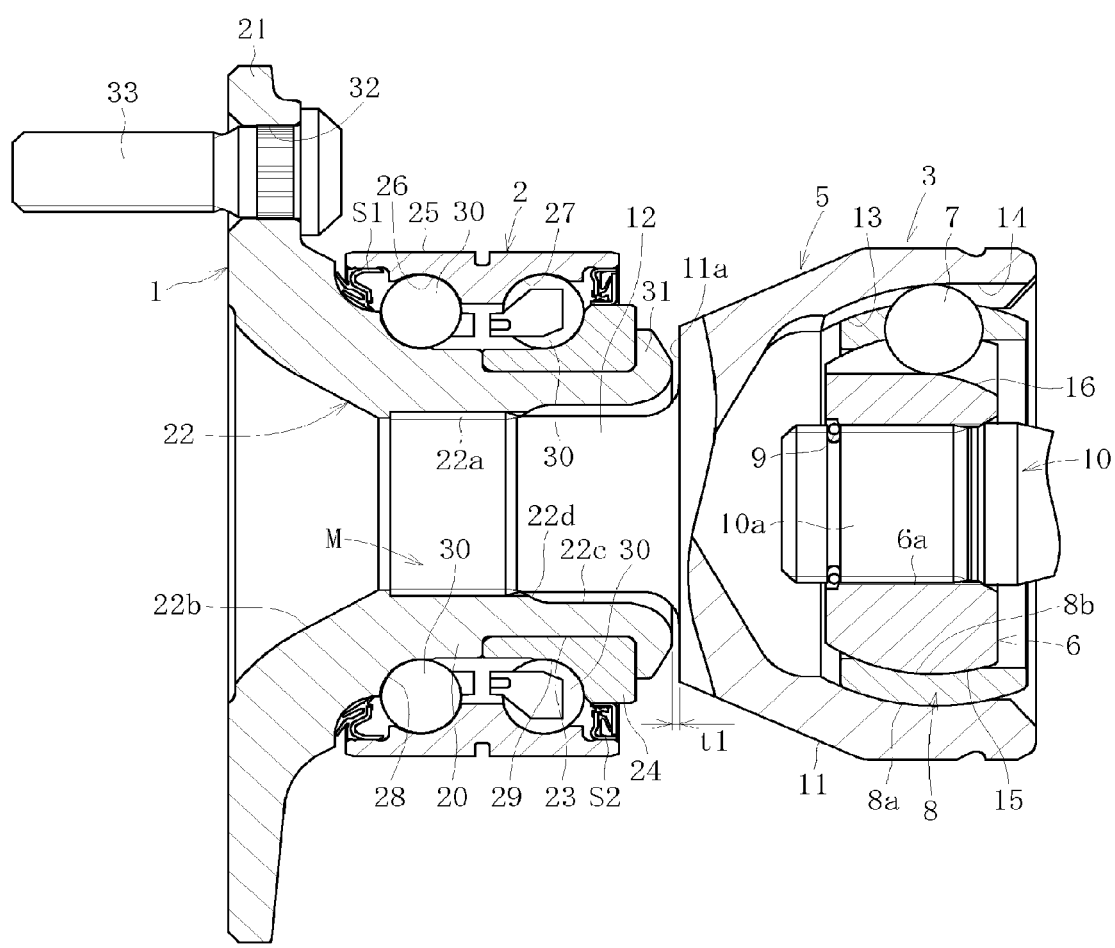
FIG. 1 is a longitudinal sectional view of a bearing device for a wheel according to a first embodiment of the present invention.

Embodiments of the present invention are described below with reference to FIGS. 1 to 21. A bearing device for a wheel according to a first embodiment is illustrated in FIG. 1. In this bearing device for a wheel, a hub wheel 1, a double-row roller bearing 2, and a constant velocity universal joint 3 are united together.

The constant velocity universal joint 3 mainly includes an outer race 5 as an outer joint member, an inner race 6 as an inner joint member arranged on the inner side of the outer race 5, multiple balls 7 provided between the outer race 5 and the inner race 6 to transmit torque, and a cage 8 provided between the outer race 5 and the inner race 6 to retain the balls 7. An end portion 10a of a shaft 10 is press-fitted into a shaft hole inner diameter 6a of the inner race 6 to effect spline fitting, whereby connection with the shaft 10 is effected so as to allow torque transmission. A stop ring 9 for preventing shaft slipping-off is fitted in the end portion 10a of the shaft 10.

The outer race 5 includes a mouth section 11 and a shaft section (shaft section) 12, and the mouth section 11 is formed in a cup-like shape open at its one end. In an inner spherical surface 13 thereof, there are formed multiple axially extending track grooves 14 at equal circumferential intervals. The track grooves 14 extend to the open end of the mouth section 11. The inner race 6 has in an outer spherical surface 15 thereof multiple axially extending track grooves 16 formed at equal circumferential intervals.

The track grooves 14 of the outer race 5 and the track grooves 16 of the inner race 6 are paired with each other, and one ball 7 as a torque transmission element is incorporated into a ball track formed by each pair of track grooves 14 and 16 so as to be capable of rolling. The balls 7 are provided between the track grooves 14 of the outer race 5 and the track grooves 16 of the inner race 6 to transmit torque. The cage 8 is slidably provided between the outer race 5 and the inner race 6, with an outer spherical surface 8a thereof coming into contact with the inner spherical surface 13 of the outer race 5 and an inner spherical surface 8b thereof coming into contact with the outer spherical surface 15 of the inner race 6. While in this case the constant velocity universal joint is of the undercut free type, in which each of the track grooves 14 and 16 has a linear straight section provided to a groove bottom, it is also possible to adopt a constant velocity universal joint of some other type such as the Rzeppa type.

The hub wheel 1 has a cylinder section 20 and a flange 21 provided to an end portion on an opposite joint side of the cylinder section 20. A hole 22 of the cylinder section 20 includes a shaft section fitting hole 22a formed at an intermediate section in an axial direction, a tapered hole 22b on the opposite joint side, and a large diameter hole 22c on a joint side. That is, in the shaft section fitting hole 22a, the shaft section 12 of the outer race 5 of the constant velocity universal joint 3 and the hub wheel 1 are connected to each other through an intermediation of a recess-projection fitting structure M described later. Further, between the shaft section fitting hole 22a and the large diameter hole 22c, a tapered section (tapered hole) 22d is provided. The tapered section 22d decreases in diameter along a press-fitting direction when the hub wheel 1 and the shaft section 12 of the outer race 5 are connected to each other. A tapered angle θ (see FIG. 7) of the tapered section 22d is set to, for example, 15° to 75°.

The roller bearing 2 includes an inner race 24 that fit in a small diameter step section 23 provided on the joint side of the cylinder section 20 of the hub wheel 1 and an outer member 25 provided on an outer circumferential side of the cylinder section 20 of the hub wheel 1. In the outer member 25, outer raceway surfaces (outer races) 26 and 27 in two rows are provided on an inner circumference thereof. The first outer raceway surface 26 and a first inner raceway surface (inner race) 28 provided on an outer circumference of the cylinder section 20 of the hub wheel 1 are opposed to each other. The second outer raceway surface 27 and a second inner raceway surface (inner race) 29 provided on an outer circumferential surface of the inner race 24 are opposed to each other. Balls as rolling elements 30 are interposed between the first outer raceway surface 26 and the first inner raceway surface 28 and between the second outer raceway surface 27 and the second inner raceway surface 29. Seal members S1 and S2 are inserted in both openings of the outer member 25.

In this case, the end on the joint side of the hub wheel 1 is caulked, whereby preload is applied to the roller bearing 2. Consequently, the inner race 24 can be fastened to the hub wheel 1. Further, a bolt inserting hole 32 is provided in the flange 21 of the hub wheel 1, and a hub bolt 33 for fixing a wheel and a brake rotor to the flange 21 is inserted into the bolt inserting hole 32.

Figure 2A:
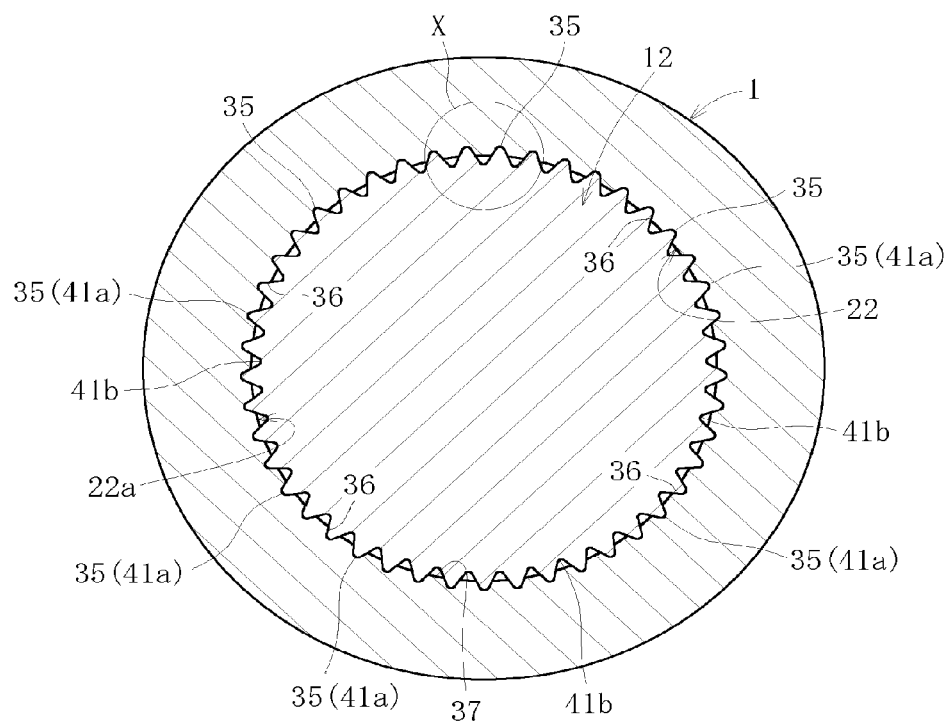
FIG. 2A is an enlarged sectional view illustrating a recess-projection fitting structure of the bearing device for a wheel.

As illustrated in FIG. 2A, the recess-projection fitting structure M is formed, for example, of axially extending projections 35 provided to the shaft portion 12, and recesses 36 formed in the inner surface of the hole section 22 of the hub wheel 1 (inner surface 37 of the shaft section fitting hole 22a in this case). The entire regions of the fitting contact regions 38 of the projections 35 and the recesses 36 of the hub wheel 1 fitted in the projections 35 are held in close contact. In other words, multiple projections 35 are arranged at a predetermined circumferential pitch on the outer peripheral surface of the opposite mouth section side of the shaft portion 12, and multiple recesses 36 to be fitted in the projections 35 are formed circumferentially in the inner surface 37 of the shaft section fitting hole 22a of the hole 22 of the hub wheel 1. That is, over the circumferential entire periphery, the projections 35 and the recesses 36 fit-engaged thereto are tightly fitted in each other.

In this case, the respective projections 35 are formed in a triangular shape (ridge shape) having a vertex of a projected R shape in section. Recess fitting contact regions of the projections 35 are ranges 75 illustrated in FIG. 2B and ranges from halfway sections of the ridges in section to the tops of the ridges. A gap 40 is formed further on an inner surface side than an inner surface 37 of the hub wheel 1 between the projections 35 adjacent to each other in the circumferential direction.

In this way, the hub wheel 1 and the shaft portion 12 of the outer race 5 of the constant velocity universal joint 3 can be connected through an intermediation of the recess-projection fitting structure M. In this case, the end on the joint side of the hub wheel 1 is caulked and preload is applied to the roller bearing 2 by the caulked section 31, and hence it is unnecessary to apply preload to the roller bearing 2 in the mouth section 11 of the outer race 5, whereby the mouth section 11 is out of contact with the end of the hub wheel 1 (in this case, caulked section 31).

According to the present invention, in the recess-projection fitting structure M, the entire regions of the fitting contact regions 38 between the projections 35 and the recesses 36 are held in close contact, and hence a gap in which a backlash occurs is not formed in a diameter direction and a circumferential direction. Thus, the entire fitting regions contribute to rotation torque transmission, and stable torque transmission is possible. In addition, noise is not generated.

The mouth section 11 is out of contact with the hub wheel 1, in other words, a gap t1 (see FIG. 1) is provided between a bottom wall outer surface 11a of the mouth section 11 and the outer surface of the caulked section 31, and hence it is possible to suppress generation of noise due to contact between the mouth section 11 and the hub wheel 1. In the present invention, if it is possible to prevent the generation of noise, the mouth section 11 and the caulked section 31 of the hub wheel 1 may be held in contact with each other. Further, the end portion of the hub wheel 1 is caulked and preload is applied to the roller bearing 2, and hence it is unnecessary to apply the preload to the roller bearing 2 by the mouth section 11 of the outer joint member. Thus, without taking the preload to the roller bearing 2 into consideration, it is possible to press-fit the shaft section 12 of the outer joint member, and to realize improvement of connectability (assemblability) between the hub wheel 1 and the outer joint member.

Figure 3:
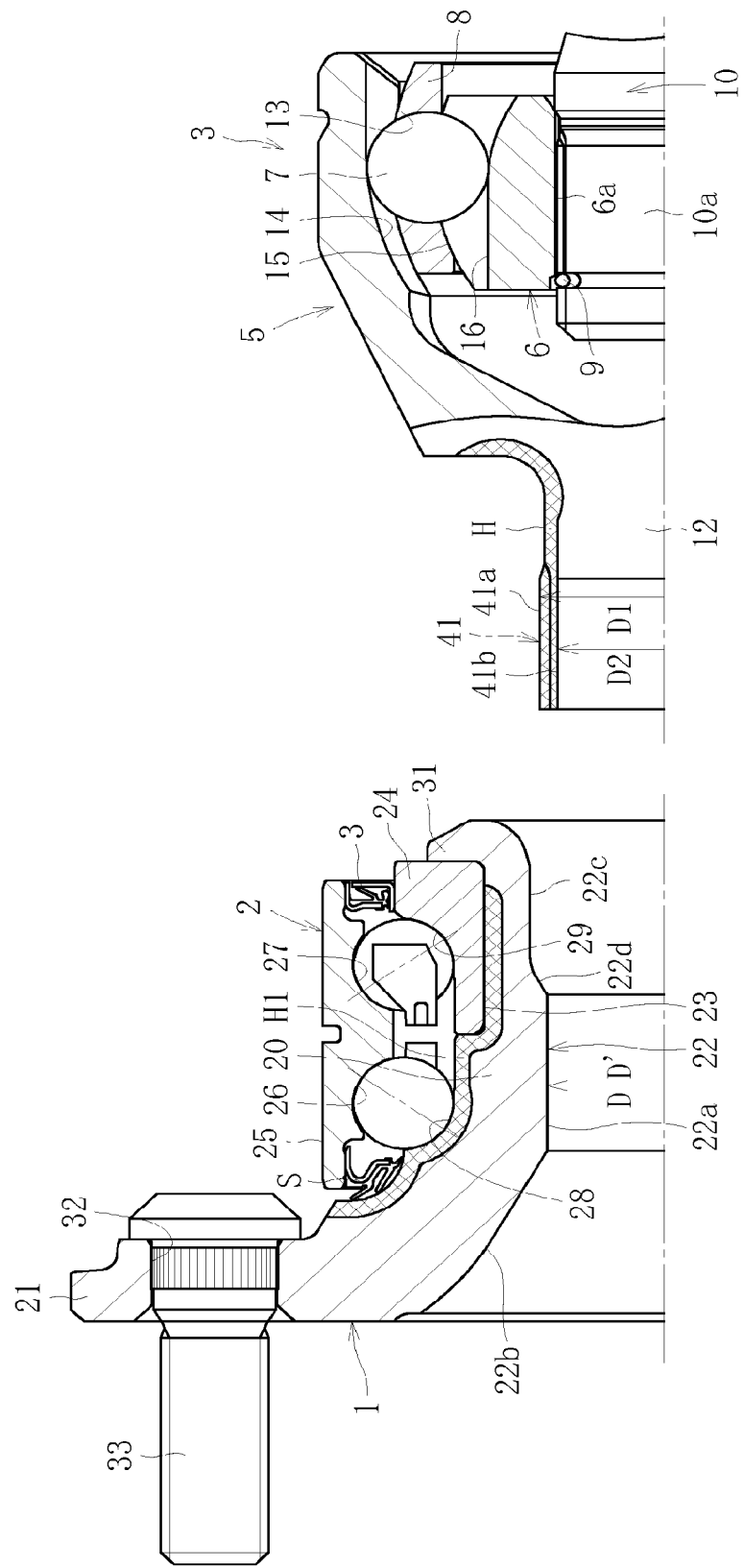
FIG. 3 is a sectional view illustrating a state in which the bearing device for a wheel is disassembled.

A method of fitting the recess-projection fitting structure M is described. In this case, as illustrated in FIG. 3, thermal hardening treatment is performed an outer surface portion of the shaft portion 12. The spline 41 including projections 41a and recesses 41b along the axial direction is formed in this hardened layer H. Therefore, the projections 41a of the spline 41 are hardened and change to the projections 35 of the recess-projection fitting structure M. A range of the hardened layer H in this embodiment is, as indicated by a cross hatching section, from an outer edge of the spline 41 to a part of a bottom wall of the mouth section 11 of the outer race 5. As this thermal hardening treatment, various kinds of heat treatment such as induction hardening and carburizing can be adopted. The induction hardening is a hardening method employing the principle of inserting a section necessary for hardening into a coil through which a high-frequency current flows, generating Joule heat with an electromagnetic induction action, and heating a conductive substance. The carburizing is a method of causing carbon to intrude/spread from the surface of a low carbon material and performing hardening after that. The teeth of the spline 41 of the shaft section 12 have a module equal to or smaller than 0.5. Here, the module is a ratio of a pitch diameter of the spline divided by the number of teeth.

Further, a hardened layer H1 by the induction hardening is formed on the outer surface side of the hub wheel 1 and the inner surface side of the hub wheel 1 is left in an unhardened state. A range of the hardened layer H1 in this embodiment is, as indicated by a cross hatching section, from the base section of the flange 21 to near the caulked section of the step section 23 in which the inner race 24 fits. If the induction hardening is performed, the surface can be hard and its inside can be kept in hardness of a material. Therefore, the inner surface side of the hub wheel 1 can be maintained in the unhardened state. The inner surface 37 side of the hole 22 of the hub wheel 1 is an unhardened section not subjected to the thermal hardening treatment (in an unhardened state). A hardness difference between the hardened layer H of the shaft section 12 of the outer race 5 and the unhardened section of the hub wheel 1 is set to be equal to or larger than 30 points in HRC.

In this case, a projecting direction intermediate region of the projections 35 corresponds to a position of a recess forming surface before recess formation (in this case, inner surface 37 of the hole 22 of the hub wheel 1). That is, an inner diameter dimension D of the inner surface 37 of the shaft section fitting hole 22a of the hole 22 is set to be smaller than a maximum outer diameter of the projections 35, i.e., a maximum diameter dimension (circumscribed circle diameter) D1 of a circle connecting vertexes of the projections 35 as the projections 41a of the spline 41 and is set to be larger than an outer diameter dimension of a shaft section outer surface among the projections, i.e., a maximum diameter dimension D2 of a circle connecting bottoms of the recesses 41b of the spline 41. In other words, the dimensions are set in a relation of D2<D<D1.

The spline 41 can be formed by various machining methods such as component rolling, cutting, pressing, and drawing, which are publicly known and used conventional means. As the thermal hardening treatment, various kinds of heat treatment such as induction hardening and carburizing can be adopted.

Then, as illustrated in FIG. 3, the shaft section 12 of the outer race 5 is inserted (press-fit) into the hub wheel 1 in a state in which the axis of the hub wheel 1 and the axis of the outer race 5 of the constant velocity universal joint 3 are aligned. In this case, the diameter dimension D of the inner surface 37 of the hole 22, the maximum outer diameter dimension D1 of the projections 35, and the minimum outer diameter dimension D2 of the recesses of the spline 4l are in the relation described above. Moreover, the hardness of the projections 35 is larger than the hardness of the inner surface 37 of the hole 22 by 30 points or more. Therefore, if the shaft section 12 is press-fitted into the hole 22 of the hub wheel 1, the projections 35 bite in the inner surface 37, and the projections 35 form the recesses 36, in which the projections 35 fit, along the axial direction.

Figure 2B:
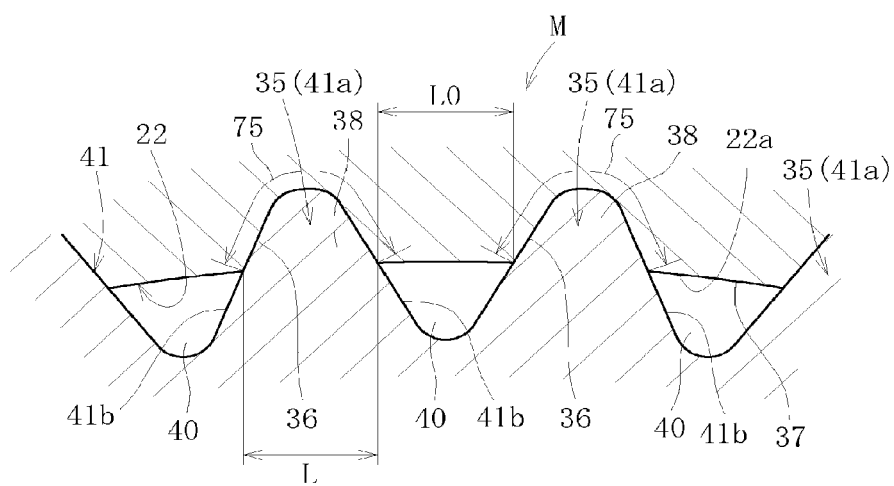
FIG. 2B is an enlarged view of an X section of FIG. 2A, illustrating the recess-projection fitting structure of the bearing device for a wheel.

Thus, as illustrated in FIGS. 2A and 2B, the entire fitting contact regions 38 of the projections 35 at the end of the shaft portion 12 and the recesses 36 fit therein are brought into intimate contact with each other. In other words, a shape of the projections 35 is transferred onto a recess formation surface on the opposite side (in this case, the inner surface 37 of the hole 22). When the shape is transferred, because the projections 35 bite in the inner surface 37 of the hole 22, the hole 22 is slightly expanded in diameter and allows movement in the axial direction of the projections 35. If the movement in the axial direction stops, the hole 22 decreases in diameter to return to the original diameter. In other words, the hub wheel 1 is elastically deformed in the diameter direction when the projections 35 are press-fitted, and preload equivalent to this elastic deformation is applied to a tooth surface of the projections 35 (surface of the recess fitting region). Therefore, it is possible to surely form the recess-projection fitting structure M in which the entire recess fitting regions of the projections 35 are brought into intimate contact to the recesses 36 corresponding thereto. Moreover, it is unnecessary to form spline sections and the like in a member (in this case, the hub wheel 1) in which the recesses 36 are formed. The bearing device for a wheel is excellent in productivity. Further, phase alignment of the splines is unnecessary. It is possible to realize improvement of assemblability, prevent damage to the tooth surfaces during press-fitting, and maintain a stable fit state.

As in the above-mentioned embodiment, teeth with a module equal to or smaller than 0.5 are used in the spline 41 formed in the shaft portion 12. Therefore, it is possible to realize improvement of moldability of this spline 41 and realize a reduction in press-fitting load. Because the projections 35 can be formed by a spline normally formed in the shaft of this kind, it is possible to easily form the projections 35 at low cost.

When the recesses 36 are formed by press-fitting the shaft portion 12 into the hub wheel 1, work hardening occurs on the recesses 36 side. The work hardening means that, when plastic deformation (plastic working) is applied to an object, resistance against deformation increases as a degree of deformation increases and the object becomes harder than a material not subjected to deformation. Therefore, according to plastic deformation during press-fitting, the inner surface 37 of the hub wheel 1 on the recesses 36 side hardens. It is possible to realize improvement of rotation torque transmission performance.

The inner surface side of the hub wheel 1 is relatively soft. Therefore, it is possible to realize improvement of fittability (adhesiveness) in fitting the projections 35 of the outer surface of the shaft portion 12 of the outer race 5 in the recesses 36 of the hole inner surface of the hub wheel 1. It is possible to accurately suppress a backlash from occurring in the diameter direction and the circumferential direction. Moreover, the hardened layer H1 is formed on the outer surface side of the hub wheel 1, and hence it is possible to realize improvement of strength and durability of the hub wheel 1. In particular, the hardened layer H1 is formed by the induction hardening, whereby hardening on the inner surface side is prevented and the unhardened state on the inner surface side is stably secured.

By the way, in the spline 41 illustrated in FIG. 3, the pitch of the projections 41a and the pitch of the recesses 41b are set to the same value. Thus, in the above-mentioned embodiment, as illustrated in FIG. 2B, a circumferential thickness L of projecting direction intermediate regions of the projections 35, and a circumferential dimension L0 in a position corresponding to the intermediate region between the projections 35 adjacent to each other in the circumferential direction are substantially the same.

Figure 4:
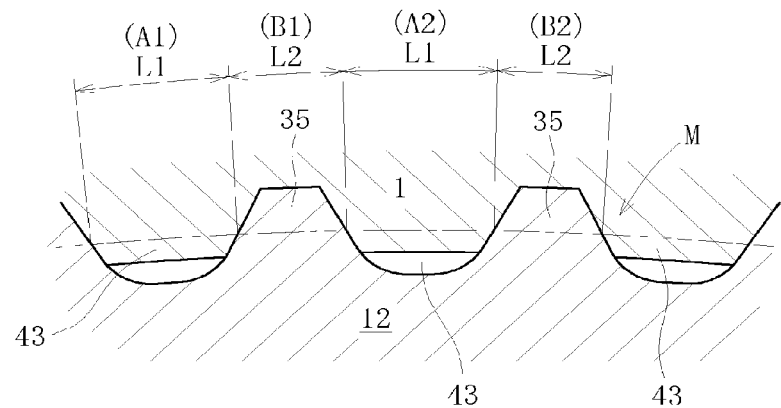
FIG. 4 is an enlarged sectional view of a main part of a recess-projection fitting structure according to a modification.

On the other hand, as illustrated in FIG. 4, a circumferential thickness L2 of the projecting direction intermediate regions of the projections 35 may be smaller than a circumferential dimension L1 in a position corresponding to the intermediate region between the projections 35 adjacent to each other in the circumferential direction. In other words, in the spline 41 formed in the shaft portion 12, the circumferential thickness (tooth thickness) L2 of the projecting direction intermediate regions of the projections 35 is set to be smaller than the circumferential thickness (tooth thickness) L1 of projecting direction intermediate regions of projections 43 on the hub wheel 1 side, that fit in between the projections 35.

Therefore, a sum $\Sigma(B1+B2+B3+\ldots)$ of tooth thicknesses of the projections 35 in the entire circumference on the shaft portion 12 side is set to be smaller than a sum $\Sigma(A1+A2+A3+\ldots)$ of tooth thicknesses of the projections 43 (projecting teeth) on the hub wheel 1 side. Consequently, it is possible to increase a shearing area of the projections 43 on the hub wheel 1 side and secure torsion strength. Moreover, the tooth thickness of the projections 35 is small, and hence it is possible to reduce press-fitting load and realize improvement of press-fitting performance. When a sum of circumferential thicknesses of the projections 35 is set to be smaller than a sum of circumferential thicknesses of the projections 43 on the opposite side, it is unnecessary to set the circumferential thickness L2 of all the projections 35 smaller than the dimension L1 in the circumferential direction between the projections 35 adjacent to each other in the circumferential direction. In other words, even if the circumferential thickness of arbitrary projections 35 among the multiple projections 35 is the same as or larger than a dimension in the circumferential direction between the projections adjacent to each other in the circumferential direction, a sum of circumferential thicknesses only has to be smaller than a sum of dimensions in the circumferential direction. Note that a sectional shape of the projections 35 in FIG. 4 are trapezoidal.

Further, when the shaft section 12 of the outer race 5 is press-fitted into the hole 22 of the hub wheel 1, the tapered section 22d for centering can constitute a guide at the start of press-fitting. Thus, it is possible to press-fit the shaft section 12 of the outer race 5 into the hole 22 of the hub wheel 1 without causing decentering to thereby perform stable torque transmission.

Figure 11:
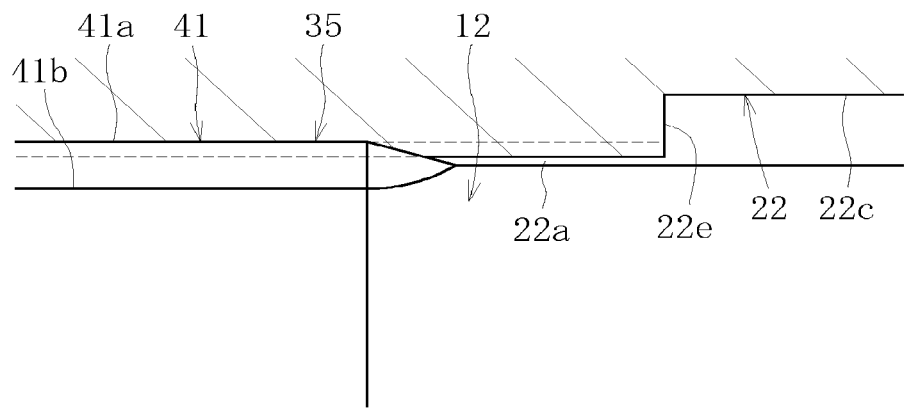
FIG. 11 is an enlarged view of a main part of a hub wheel according to a comparative example.

In comparison thereto, as illustrated in FIG. 11, in the case where, in the hole 22 of the hub wheel 1, the tapered section 22d is not formed between the fitting hole 22a and the large diameter hole 22c but a step section 22e is formed therebetween, centering can not be performed when the shaft section 12 of the outer race 5 is press-fitted into the hole 22 of the hub wheel 1, and hence there is a risk of causing decentering between the hub wheel 1 and the outer race 5 of the constant velocity universal joint 3. Therefore, it is preferred to set the inclination angle θ (see FIG. 7) of the tapered section 22d to 15° to 75° as described above. That is, if the inclination angle is less than 15°, the tapered section 22d can exert a function as the guide. However, the axial length of the tapered section 22d is elongated, whereby workability of press-fitting is deteriorated, and there is a risk that the axial length of the hub wheel 1 is elongated. Further, if the inclination angle exceeds 75°, as in the case of forming the step section 22e as illustrated in FIG. 11, there is a risk of causing decentering.

Figure 5:
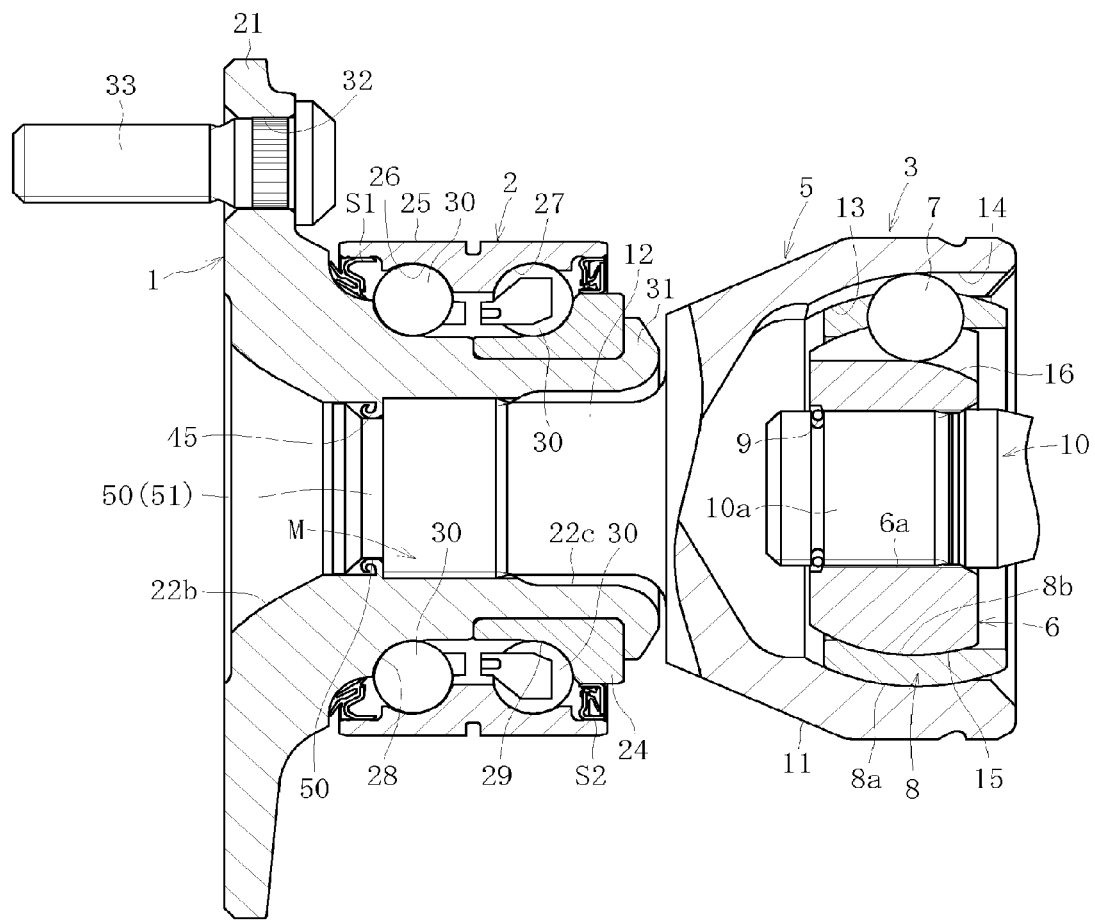
FIG. 5 is a longitudinal sectional view of a bearing device for a wheel according to a second embodiment of the present invention.

Incidentally, when the shaft section 12 of the outer race 5 is press-fitted into the hub wheel 1, a material is extruded from the recesses 36 formed by the projections 35, and an extruded portion 45 according to a second embodiment illustrated in FIG. 5 is formed. The extruded portion 45 is equivalent to a volume of the material of the recesses 36 in which recess fitting regions of the projections 35 are fitted. The extruded portion 45 includes the material extruded from the recesses 36 to be formed, the material cut for forming the recesses 36, or the material extruded and cut.

Therefore, in the bearing device for a wheel illustrated in FIG. 1, removal work for the extruded portion 45 is required after the constant velocity universal joint is assembled to the hub wheel 1. Thus, in this embodiment, as described above, a pocket section 50 for storing the extruded portion 45 is provided to the shaft section 12.

Figure 6:
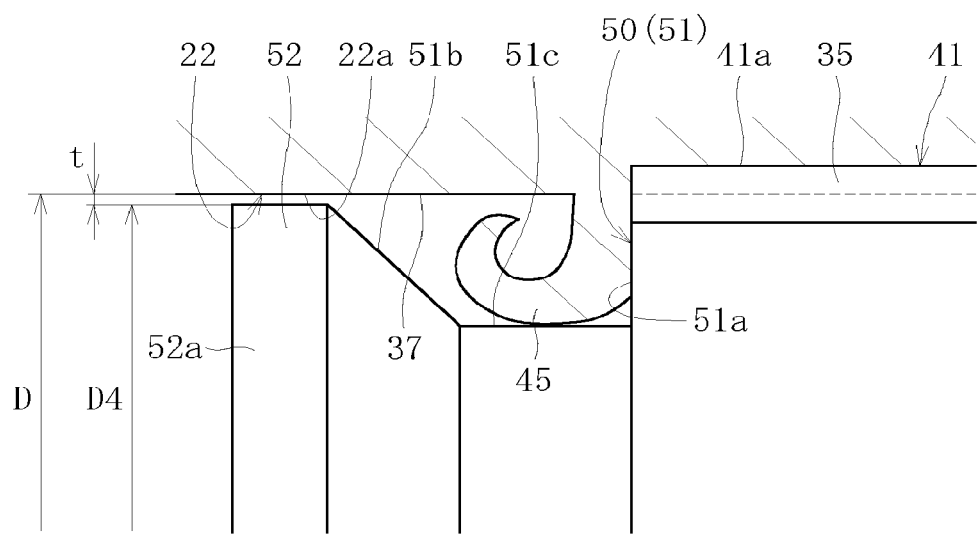
FIG. 6 is an enlarged sectional view of a main part of FIG. 5.
Figure 7:
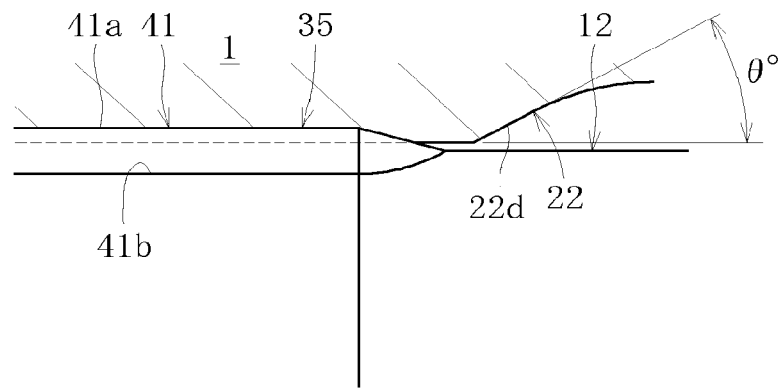
FIG. 7 is an enlarged view of a main part of a hub wheel of the bearing device for a wheel illustrated in FIG. 1.

The pocket section 50 is formed by providing a circumferential groove 51 at the shaft edge of the spline 41 of the shaft section 12. As illustrated in FIG. 6, in the circumferential groove 51, a side wall 51a on the spline 41 side is a plane orthogonal to the axial direction, and a side surface 51b on an opposite spline side is a tapered surface that expands in diameter from a groove bottom 51c to the opposite spline side.

Further, a disc-like collar section 52 for centering is provided further on the opposite spline side with respect to the side surface 51b. An outer diameter dimension D4 of the collar section 52 is set the same as or slightly smaller than the hole diameter of the fitting hole 22a of the hole 22. In this case, a very small gap t is provided between an outer surface 52a of the collar section 52 and the inner surface of the fitting hole 22a of the hole 22.

When the shaft section 12 is press-fitted into the hole 22 of the hub wheel 1, as illustrated in FIG. 6, the extruded portion 45 to be formed is stored in the pocket section 50 while curling. In other words, a part of the material scraped off or extruded from the inner surface of the hole 22 enters the pocket section 50.

By providing the pocket section 50 for storing the extruded portion 45 caused by recess formation by the press-fitting, it is possible to hold (maintain) the extruded portion 45 in this pocket section 50. Further, the extruded portion 45 does not enter the inside of the vehicle and the like on the outside of the device. In other words, the extruded portion 45 can be kept stored in the pocket section 50. It is unnecessary to perform removal processing for the extruded portion 45. It is possible to realize a reduction in assembly work man-hour and realize improvement of assembly workability and cost reduction.

Further, by providing, in the axial direction of the pocket section 50, the collar section 52 for centering with the hole 22 of the hub wheel 1 on the opposite projection side, ejection of the extruded portion 45 in the pocket section 50 to the collar section 52 side is eliminated. Therefore, the extruded portion 45 is more stably stored. Moreover, the collar section 52 is used for centering, and hence it is possible to press-fit the shaft portion 12 into the hub wheel 1 while preventing decentering. Therefore, it is possible to highly accurately connect the outer race 5 and the hub wheel 1 and to perform stable torque transmission.

The collar section 52 is used for centering during press-fitting, and hence it is preferred to set an outer diameter dimension thereof to a degree slightly smaller than a hole diameter of the fitting hole 22a of the hole 22 of the hub wheel 1. If the outer diameter dimension of the collar section 52 is the same as or larger than the hole diameter of the fitting hole 22a, the collar section 52 itself is press-fitted into the fitting hole 22a. When the collar section 52 is press-fitted into the fitting hole 22a, if the collar section 52 and the fitting hole 22a are decentered, the projections 35 of the recess-projection fitting structure M are press-fitted in this state and the shaft portion 12 and the hub wheel 1 are connected in a state in which the axis of the shaft portion 12 and the axis of the hub wheel 1 are not aligned. If the outer diameter dimension of the collar section 52 is too smaller than the hole diameter of the fitting hole 22a, the collar section 52 does not function as a section for centering. Therefore, it is preferred to set the very small gap t between the outer surface 52a of the collar section 52 and the inner surface of the fitting hole 22a of the hole 22 to about 0.01 mm to 0.2 mm.

As the recess-projection fitting structure M, serrate recess-projection portions 55 may be formed in the projections 35 of the shaft section 12, that is, in the projections 41a of the spline 41. The recess-projection portions 55 are small recess-projection portions formed along the longitudinal direction of tops of the projections 41a. In this case, a sectional shape of projections (projected teeth) 55a is a right-angled triangle having a side inclined to the pocket side. The recess-projection portions 55 in the figure are provided on the pocket section 50 side.

Figure 8:
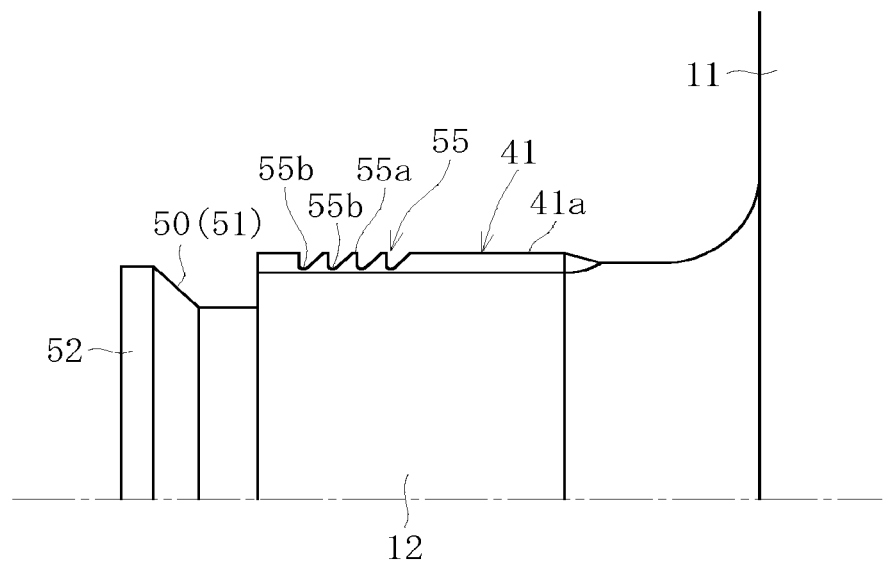
FIG. 8 is a simplified view of a shaft section of an outer race of a constant velocity universal joint according to a modification.
Figure 9:
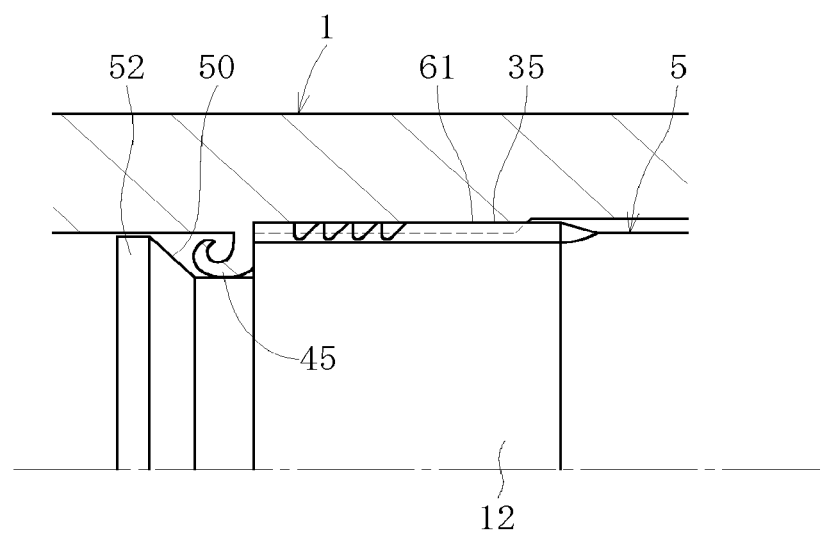
FIG. 9 is a simplified view illustrating a state in which the shaft section of the constant velocity universal joint illustrated in FIG. 8 is press-fitted into the hub wheel.
Figure 10:
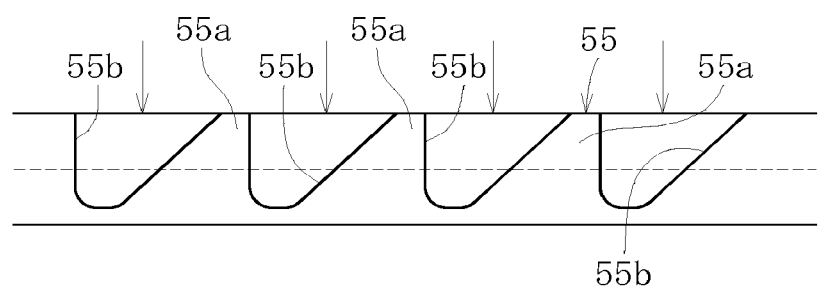
FIG. 10 is an enlarged sectional view of a main part of FIG. 9.

As illustrated in FIG. 8, when the shaft section 12 provided with the recess-projection portions 55 is press-fitted into the hole 22 of the hub wheel 1, as illustrated in FIG. 9, while centering is performed by the collar section 52, the recesses 36 are formed on the hub wheel 1 side by the projections 35 on the shaft section 12 side, whereby the extruded portion 45 is formed. Then, the extruded portion 45 is stored in the pocket section 50 while curling.

Further, during the press-fitting, the recess-projection portions 55 bite in the bottom portions of the recesses 36 formed on the hub wheel 1 side. In other words, the hole 22 of the hub wheel 1, which has expanded in diameter, expands in diameter during press-fitting, whereas the hole 22 of the hub wheel 1 decreases in diameter so as to return its original state upon completion of the press-fitting. Thus, pressing force (force for decreasing in diameter) acts on the recess-projection portions 55 from the inner surface side of the hole 22 of the hub wheel 1 as indicated by arrows of FIG. 10, and the projections 55a of the recess-projection portions 55 bite in the inner surface of the hole 22 of the hub wheel 1.

As described above, by providing the recess-projection portions (serrate portions) 55 on the projections 35 side, the projections 55a of the serrate portions 55 bite in along the axial direction during press-fitting. Owing to this biting-in, it is possible to form slipping-off in the axial direction of the outer joint member 5 of the constant velocity universal joint with respect to the hub wheel 1. Consequently, it is possible to maintain a stable connected state and realize improvement of a quality of the bearing device for a wheel. In addition, slipping-off can be formed by the serrate portions 55, and hence screw fastening in the prior art can be omitted. Therefore, it is unnecessary to form the screw section projecting from, in the shaft section 12, the hole 22 of the hub wheel 1. It is possible to realize a reduction in weight, omit screw fastening work, and realize improvement of assembly workability.

Figure 12:
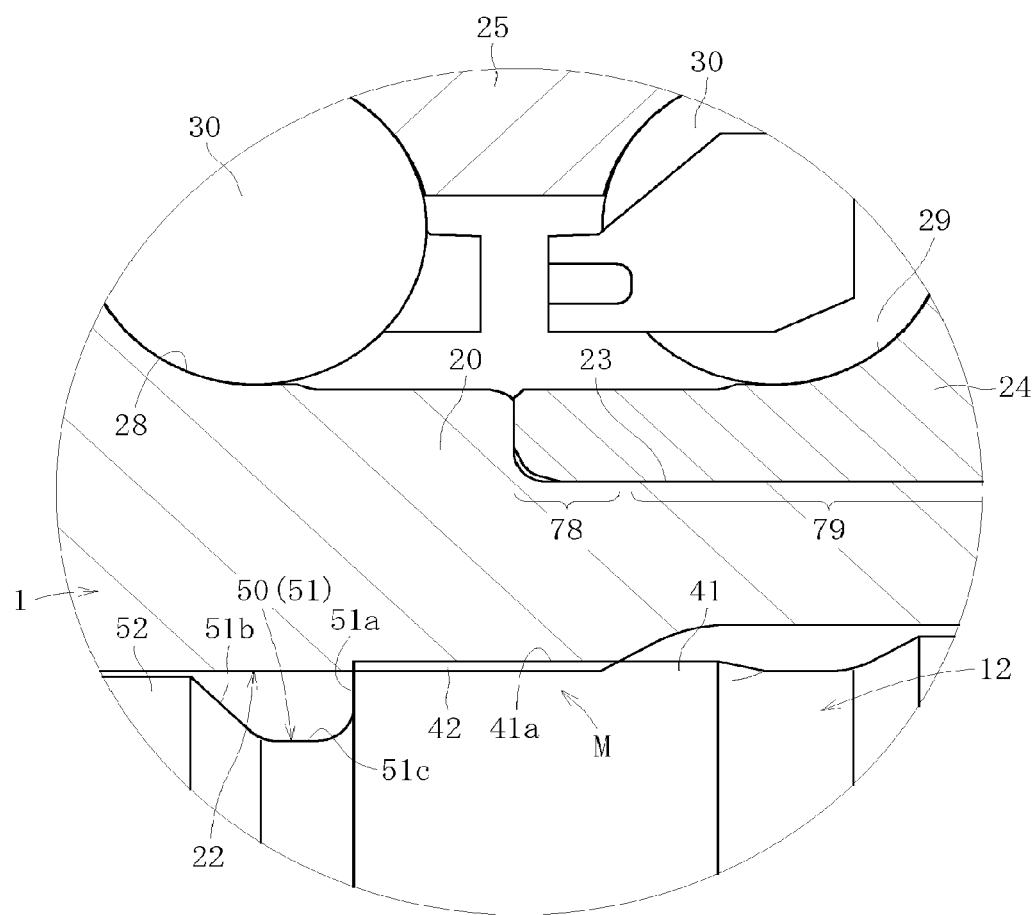
FIG. 12 is an enlarged sectional view of a main part of a bearing device for a wheel according to a third embodiment of the present invention.

In the above-mentioned bearing device for a wheel, as illustrated in FIG. 12 according to a third embodiment, it is preferred that fitting between the inner race 24 and the small diameter step section 23 in a range 78 corresponding to the outer surface side of the recess-projection fitting structure M is non-interference fitting, and fitting between the inner race 24 and the small diameter step section 23 in another range 79 is interference fitting. Here, the interference fitting means fitting always involving interference in combination. Further, the non-interference fitting means transition fitting or loose fitting. Further, the transition fitting means fitting involving a gap or interference in combination due to actual dimensions of a hole and a shaft (hole diameter of hub wheel 1 and outer diameter of stem shaft 12), and means fitting in which tolerance zones of the hole and the shaft (tolerance zones of hole diameter of hub wheel 1 and outer diameter of stem shaft 12) entirely or partially overlap each other. The loose fitting means fitting always involving a gap in combination.

The fitting between the inner race 24 and the small diameter step section 23 in the range corresponding to the outer surface side of the recess-projection fitting structure M is non-interference fitting, and hence it is possible to suppress at minimum generation of hoop stress of the inner race in the range corresponding to the outer surface side of the recess-projection fitting structure M. Thus, it is possible to prevent occurrence of a trouble with the bearing such as a reduction in rolling fatigue life, occurrence of a crack, and stress corrosion crack, and to provide a high-quality bearing device for a wheel. Further, the fitting between the inner race 24 and the small diameter step section 23 in another range corresponding to the outer surface side of the recess-projection fitting structure M is interference fitting. Accordingly, it is possible to prevent creep which is a phenomenon of relative shift between fitting surfaces, to secure stable fitting of the inner race 24, and to more stably provide a high-quality bearing device for a wheel.

Figure 13:
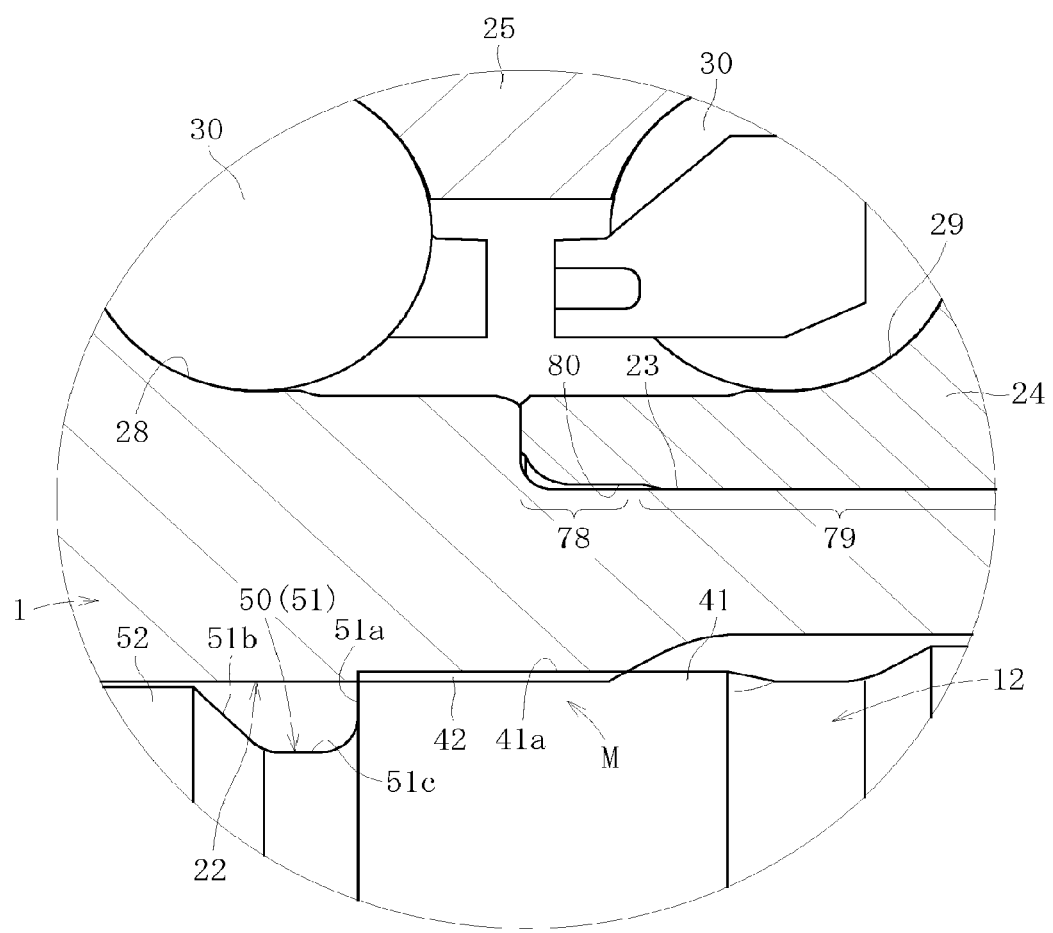
FIG. 13 is an enlarged sectional view of a main part of a bearing device for a wheel according to a modification of the present invention.

As illustrated in FIG. 13, a circumferential notch section 80 is formed on the inner surface of the inner race in the range 78 corresponding to the outer surface side of the recess-projection fitting structure M, and the non-interference fitting (loose fitting, in this case) may be formed therein.

Other components of the bearing device for a wheel illustrated in FIG. 13 are the same as those of the bearing device illustrated in FIGS. 1 and 2. Thus, the components same as those illustrated in FIGS. 1 and 2 are denoted by the same reference symbols and description of the components is omitted.

Therefore, the bearing device illustrated in FIG. 13 also realizes operations and effects same as those of the bearing device illustrated FIGS. 1 and 2. In particular, the circumferential notch section 80 is formed on the inner surface of the inner race, and the non-interference fitting is formed, whereby it is possible to form the gap between the inner race 24 and the small diameter step section 23 in this range, and to more reliably suppress the generation of hoop stress. Further, processing is not required for forming the non-interference fitting to the hub wheel side, and there is an advantage that the existing bearing device can be used.

Figure 14:
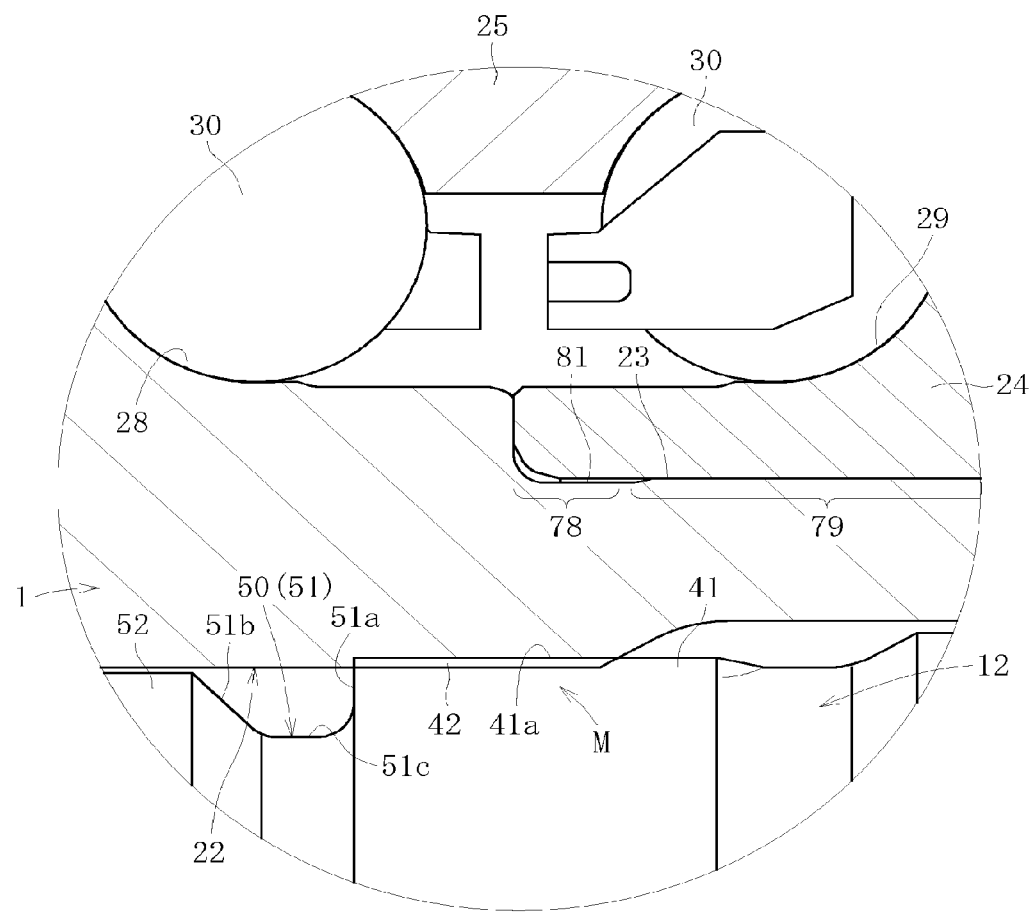
FIG. 14 is an enlarged sectional view of a main part of a bearing device for a wheel according to another modification of the present invention.

Further, as illustrated in FIG. 14, a circumferential notch section 81 is formed on the outer surface of the small diameter step section 23 of the hub wheel 1 in the range 78 corresponding to the outer surface side of the recess-projection fitting structure M, and the non-interference fitting (transition fitting, in this case) may be formed therein.

Other components of the bearing device for a wheel illustrated in FIG. 14 are the same as those of the bearing device illustrated in FIGS. 1 and 2. Thus, the components same as those illustrated in FIGS. 1 and 2 are denoted by the same reference symbols and description of the components is omitted.

Therefore, the bearing device illustrated in FIG. 14 also realizes operations and effects same as those of the bearing device illustrated FIGS. 1 and 2. In particular, the circumferential notch section 81 is formed on the outer surface of the small diameter step section 23, and the non-interference fitting is formed, whereby it is possible to form the gap between the inner race 24 and the small diameter step section 23 in this range, and to more reliably suppress the generation of hoop stress. Further, processing is not required for forming the non-interference fitting to the inner race 24 side, and there is an advantage that the existing bearing device can be used.

Figure 15:
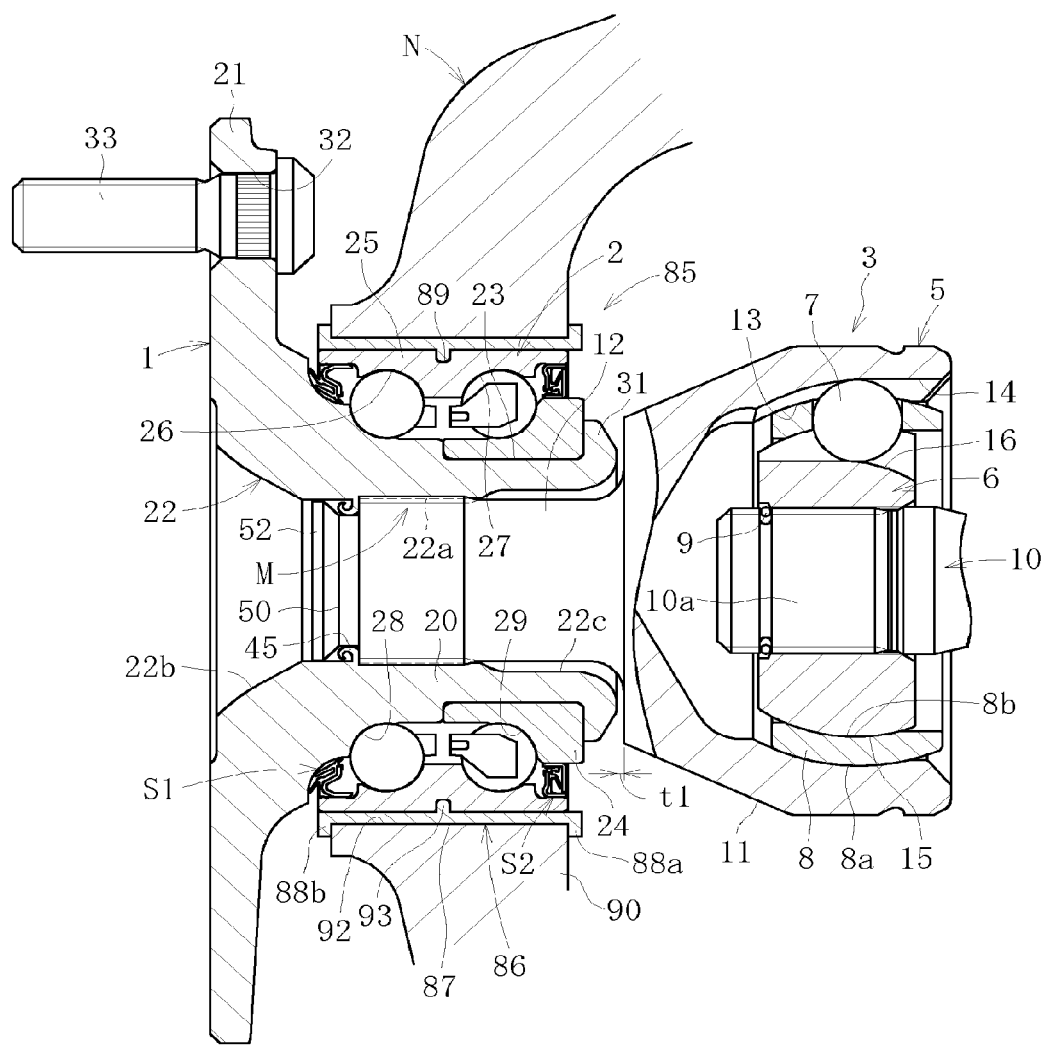
FIG. 15 is an enlarged sectional view of a main part of a bearing device for a wheel according to a fourth embodiment of the present invention.
Figure 16A:
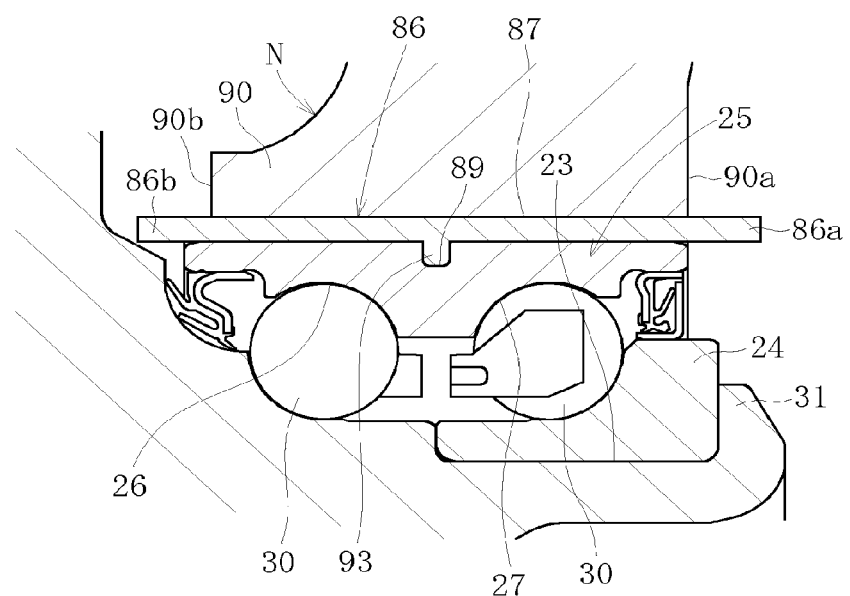
FIG. 16A is an enlarged sectional view illustrating an integral connection structure before a fixing member is caulked.
Figure 16B:
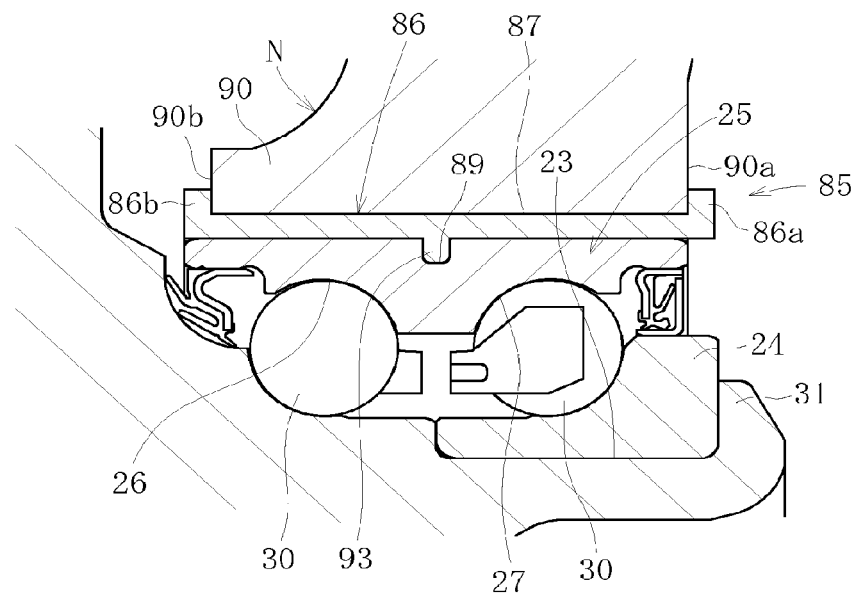
FIG. 16B is an enlarged sectional view illustrating the integral connection structure after the fixing member is caulked.

Incidentally, as illustrated in FIGS. 15, 16A, and 16B according to a fourth embodiment, in the bearing device for a wheel of this type, a knuckle N is connected to the outer member 25 of the roller bearing 2 through an intermediation of an integral connection structure 85 of a non-separation type. The integral connection structure 85 in this case includes a fixing member 86 serving as a caulked member caused to be brought into intimate contact to the outer surface of the outer member 25, and the knuckle N is externally fitted onto the fixing member 86. The fixing member 86 includes a short cylinder-shaped main body section 87 fit onto the outer member 25, and outer collar portions 88a, 88b provided at the axial end portions of the main body section 87.

In this case, a circumferential groove 89 is provided at the intermediate position in the axial direction on the outer surface of the outer member 25, and an inwardly projecting portion 93 is provided at the intermediate position in the axial direction on the inner surface of the main body section 87 of the fixing member 86. Then, in the state in which the inwardly projecting portion 93 is fitted in the circumferential groove 89, the outer member 25 and the fixing member 86 are integrated with each other. In the state in which the knuckle N is externally fitted onto the main body section 87, the outer collar portions 88a, 88b are locked to end surfaces 90a, 90b (see FIGS. 16A and 16B) of a boss section 90 having a fitting hole 92 of the knuckle N.

That is, before mounting of the knuckle, axial end portions 86a, 86b of the fixing member 86 project outwardly in the axial direction from axial edges of the outer member 25. Then, at the time of mounting of the knuckle, plastic working (caulking working) is performed such that the axial end portions 86a, 86b of the fixing member 86 project in the outer diameter direction. In this case, the caulking working may be performed on the entire or part of the circumference. With this, the knuckle N is fixed to the outer member 25 through an intermediation of the fixing member 86.

Figure 17:
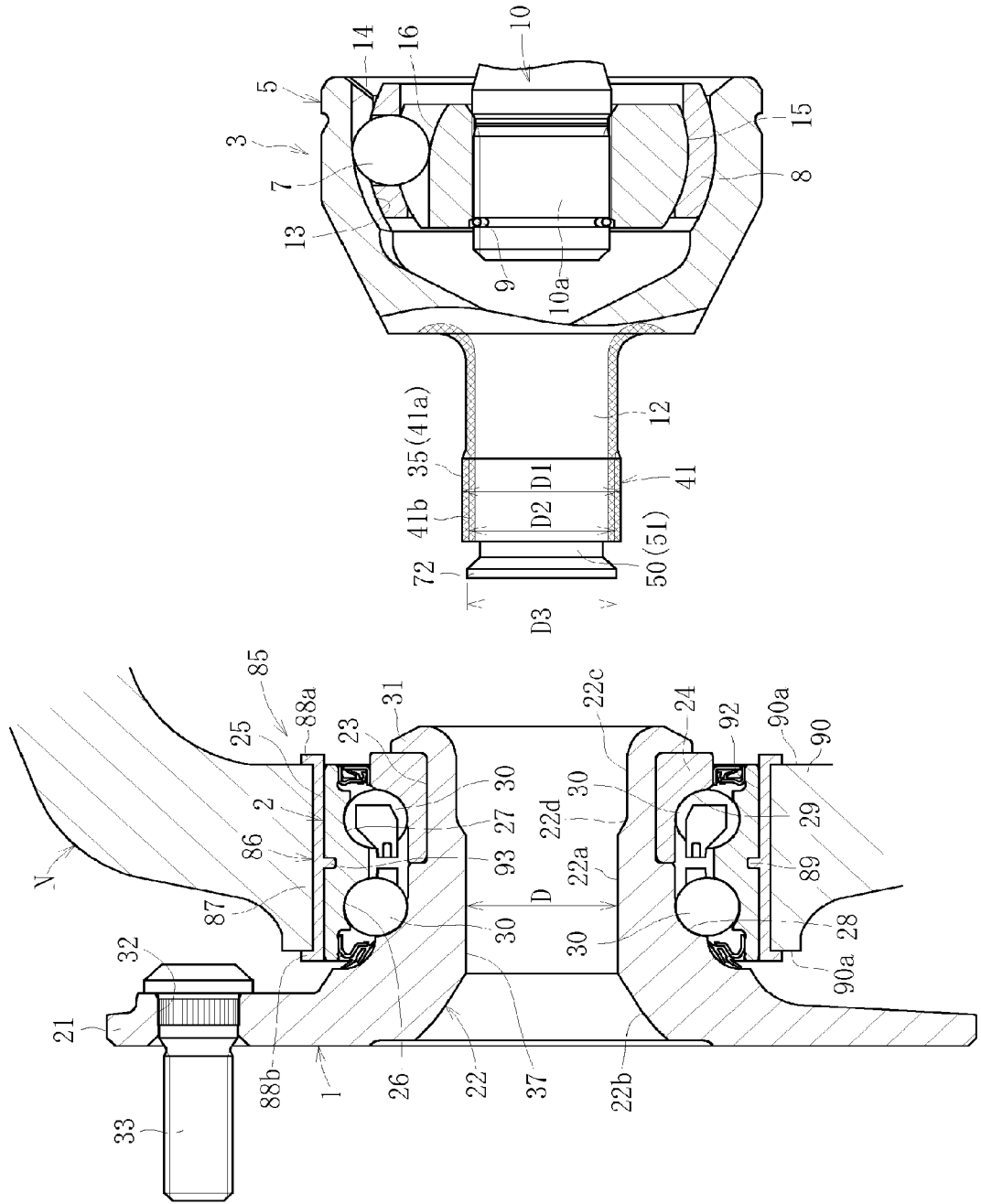
FIG. 17 is a sectional view illustrating a state in which the bearing device for a wheel illustrated in FIG. 15 is disassembled.

Also in this case, as illustrated in FIG. 17, in the state in which the axis of the hub wheel 1 and the axis of the outer race 5 of the constant velocity universal joint 3 are aligned, the shaft section 12 is press-fitted into the hole 22 of the hub wheel 1.

The knuckle N is connected to the outer member 25 through an intermediation of the integral connection structure 85 of the non-separation type, and hence a backlash does not occur between the outer member 25 and the knuckle N. Moreover, the outer member 25 and the knuckle N are integrated with each other, and hence it is possible to realize simplification (facilitation) of assembly work in vehicle assembly plants.

As described above, the backlash at the bonding portion between the hub wheel 1 and the constant velocity universal joint 3 can be suppressed, and the backlash between the outer member 25 and the knuckle N can be eliminated. Thus, it is possible to realize improvement of NVH characteristics of a vehicle using the bearing device for a wheel.

Figure 18A:
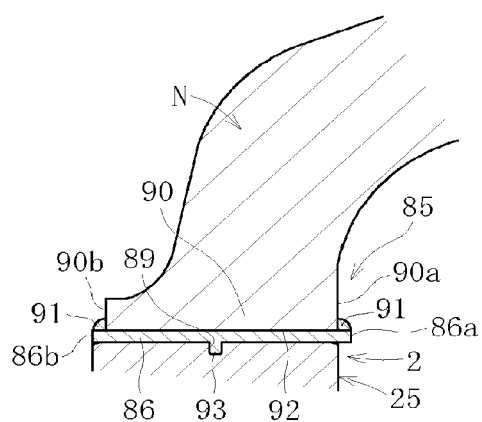
FIG. 18A is a sectional view illustrating an integral connection structure according to a modification in a case of using welding.
Figure 18B:
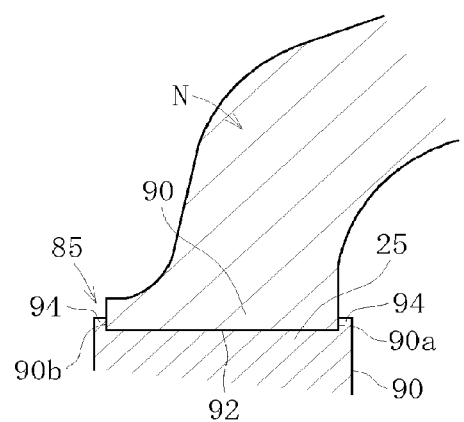
FIG. 18B is a sectional view illustrating the integral connection structure according to a modification in a case of not using the fixing member.

Next, FIGS. 18A and 18B illustrate a modification of the integral connection structure 85. The integral connection structure 85 is configured by welding in FIG. 18A, and configured by caulking of the outer member 25 which omits the fixing member 86 in FIG. 18B. In other words, without performing the plastic working on the axial end portions 86a, 86b of the fixing member 86 of FIG. 18A, the axial end portions 86a, 86b and the end surfaces 90a, 90b of the knuckle N are bonded to each other by welding. In this case, the welded portion may be the entire or part of the circumference. In FIG. 18A, a reference symbol 91 denotes the welded portion.

In FIG. 18B, the outer diameter dimension of the outer member 25 is set to substantially the same as the hole diameter of the fitting hole 92 of the boss section 90 of the knuckle N. Further, the outer member 25 is fitted in the boss section 90, and the axial end portions of the outer member 25 are caulked, whereby caulked portions 94, 94 are engaged with the end surfaces 90a, 90b of the boss section 90 of the knuckle N.

As described above, the integral connection structure 85 may be configured by caulking or welding, is excellent in workability of connection, and can integrate the outer member 25 and the knuckle N firmly.

Figure 19:
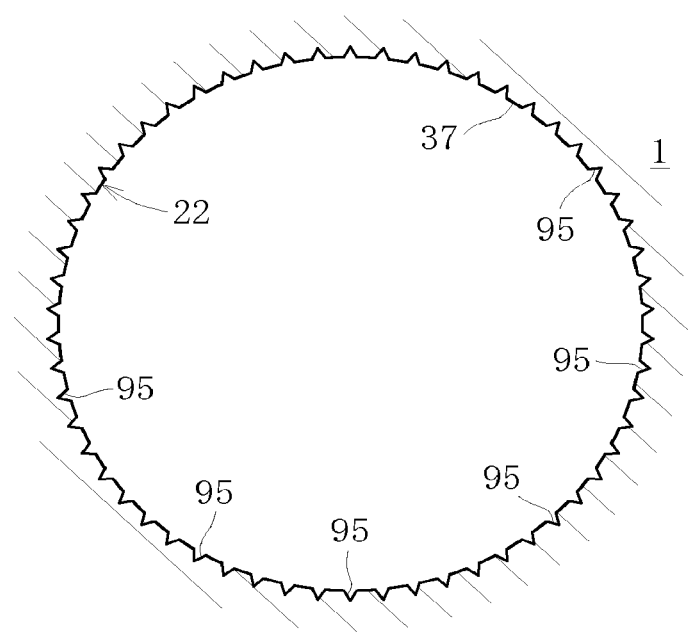
FIG. 19 is a sectional view of a hole of a hub wheel according to a modification.
Figure 20:
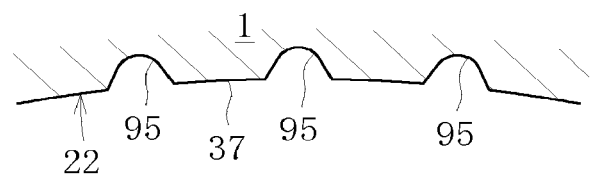
FIG. 20 is an enlarged sectional view of a hole of a hub wheel according to another modification.

Incidentally, as illustrated in FIG. 19, on the inner surface 37 of the hole 22 of the hub wheel 1, there may be provided small recesses 95 arranged at a predetermined pitch along the circumferential direction. The small recesses 95 need to have a volume smaller than that of the recesses 36. By providing the small recesses 95 as described above, it is possible to realize improvement of press-fit property of the projections 35. That is, by providing the small recesses 95, it is possible to decrease the volume of the extruded portion 45 formed during press-fitting of the projections 35, and to realize a reduction in press-fit resistance. Further, the size of the extruded portion 45 can be decreased, and hence it is possible to decrease the volume of the pocket section 50, and to realize improvement of processability of the pocket section 50 and strength of the shaft section 12. Note that, in FIG. 19, the small recesses 95 have a triangular shape with an acute top. However, as illustrated in FIG. 20, the small recesses 95 may have a triangular shape with a round top. In addition, the small recesses of various shapes such as a semi-elliptical shape and a rectangular shape can be adopted, and the number of the small recesses can be arbitrarily set.

In each of the embodiments, when the shaft section 12 of the outer race 5 is inserted (press-fit) into the hub wheel 1, by heating a unit body including the hub wheel 1 and the roller bearing 2 mounted onto the hub wheel 1, the hole 22 (at least shaft section fitting hole 22a) of the hub wheel 1 may be expanded in diameter. That is, the hole diameter of the hole 22 before heating is the value D as described above, and the hole diameter of the hole 22 after heating is the value D' larger than the value D (see FIG. 3). In this case, the value D' is set to be smaller than the value D1.

As described above, if the shaft section 12 is press-fitted into the hole 22 of the hub wheel 1, the hardness of the projections 35 is larger than the hardness of the inner surface 37 of the hole 22 by 30 points or more. Therefore, the projections 35 bite in the inner surface 37, and the projections 35 form the recesses 36, in which the projections 35 fit, along the axial direction.

In this case, the hole 22 is expanded in diameter by heating and allows movement in the axial direction of the projections 35. Then, by canceling the heating state, the hole decreases in diameter to return to the original diameter. In other words, the hub wheel 1 is thermally deformed in the diameter direction when the projections are press-fitted, and preload equivalent to this thermal deformation is applied to a tooth surface of the projections 35 (surface of recess fitting regions). Therefore, it is possible to realize improvement of adhesion property of the entire fitting contact regions 38 between the projections 35 and the recesses 36, and the outer joint member and the hub wheel 1 are fastened firmly. Moreover, it is unnecessary to form spline sections and the like in a member (hub wheel 1, in this case) in which the recesses 36 are formed. The bearing device for a wheel is excellent in productivity. Further, phase alignment of the splines is unnecessary. It is possible to realize improvement of assemblability, prevent damage to the tooth surfaces during press-fitting, and maintain a stable fitting state.

A heating expanding temperature is set to be lower than a guaranteed temperature for components of the bearing device for a wheel. Here, the guaranteed temperature is a temperature at which there can be exerted functions of the components (sealing, grease, cage, encoder, and the like) used in the bearing device for a wheel. If the heating expanding temperature is lower than this temperature, the functions of the components are not deteriorated.

As described above, the heating expanding temperature is set to be lower than the guaranteed temperature for components of the bearing device for a wheel, whereby the sealing, grease, and the like used in the bearing device for a wheel can exert their functions effectively, and it is possible to guarantee the quality of the bearing device for a wheel.

It is sufficient that the hole 22 of the hub wheel 1 is expanded in diameter and heated within a range of the guaranteed temperature. Therefore, as a heating means for heating before press-fitting, there can be used various heating means such as a furnace and a heater.

Figure 21A:
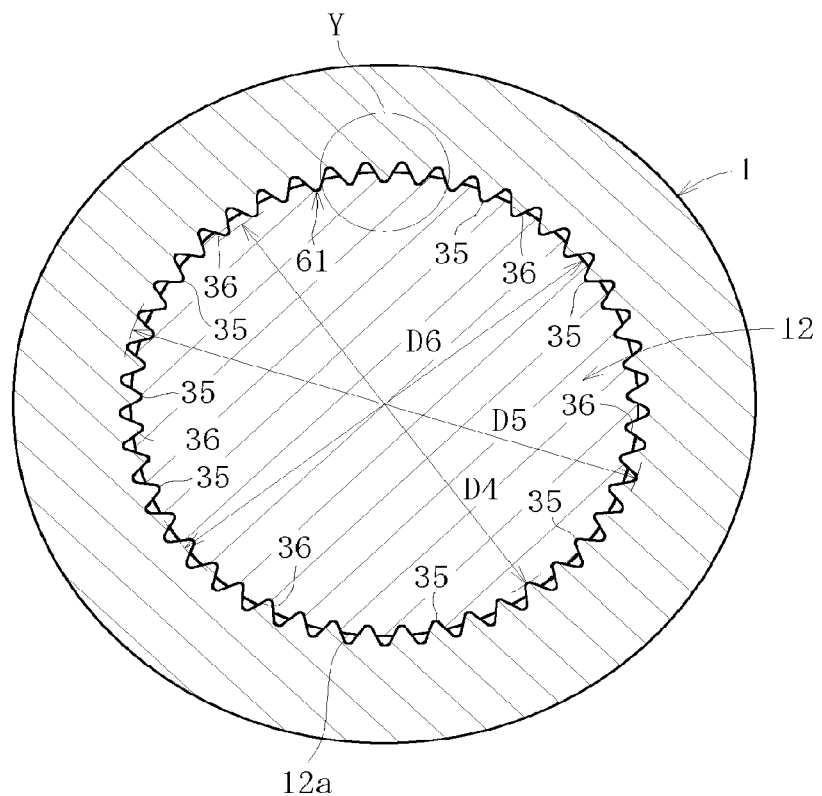
FIG. 21A is an enlarged sectional view of a main part of a bearing device for a wheel according to a fifth embodiment of the present invention.

Incidentally, in each of the embodiments, the spline 41 constituting the projections 35 is formed on the shaft section 12 side. Hardening treatment is performed on this spline 41 of the shaft section 12 and the inner surface of the hub wheel 1 is not hardened (raw material). Meanwhile, as illustrated in FIG. 21A according to a fifth embodiment, a spline 61 (including projected streaks 61a and recessed streaks 61b) subjected to hardening treatment may be formed on the inner surface of the hole 22 of the hub wheel 1, and hardening treatment may not be performed on the shaft section 12. Note that, the spline 61 can also be formed by various machining methods such as broaching, cutting, pressing, and drawing, which are publicly known and used as conventional means. Further, as the thermal hardening treatment, various kinds of heat treatment such as induction hardening or carburizing can be adopted.

In this case, the projecting direction intermediate regions of the projections 35 correspond to the position of the recess forming surface (outer surface of shaft section 12) before recess formation. That is, the diameter dimension (minimum diameter dimension of projections 35) D4 of a circle connecting vertexes of the projections 35 as the projections 61a of the spline 61 is set to be smaller than an outer diameter dimension D6 of the shaft section 12. A diameter dimension (inner diameter dimension of inner surface of fitting holes between projections) D5 of a circle connecting bottoms of the recesses 61b of the spline 61 is set to be larger than the outer diameter dimension D6 of the shaft section 12. In other words, the dimensions are set in a relation of D4<D6<D5.

When the shaft section 12 is press-fitted into the hole 22 of the hub wheel 1, by the projections 35 on the hub wheel 1 side, the recesses 36, in which the projections 35 fit, can be formed in the outer circumferential surface of the shaft section 12. Thus, the entire fitting contact regions 38 between the projections 35 and the recesses that fit on the projections 35 are brought into intimate contact with each other.

That is, when the projections 35 of the recess-projection fitting structure M are provided on the inner surface 37 of the hole 22 of the hub wheel 1, the projections 35 on the hub wheel 1 side bite in the outer surface of the shaft section 12, whereby the hole 22 of the hub wheel 1 is slightly expanded in diameter and allows movement in the axial direction of the projections 35. If the movement in the axial direction stops, the hole 22 decreases in diameter to return to the original diameter. Thus, the entire regions of the fitting contact regions between the projections 35 and the recesses 36 of an opposite member (outer surface of shaft), which fit on the projections 35, are brought into intimate contact with each other.

Figure 21B:
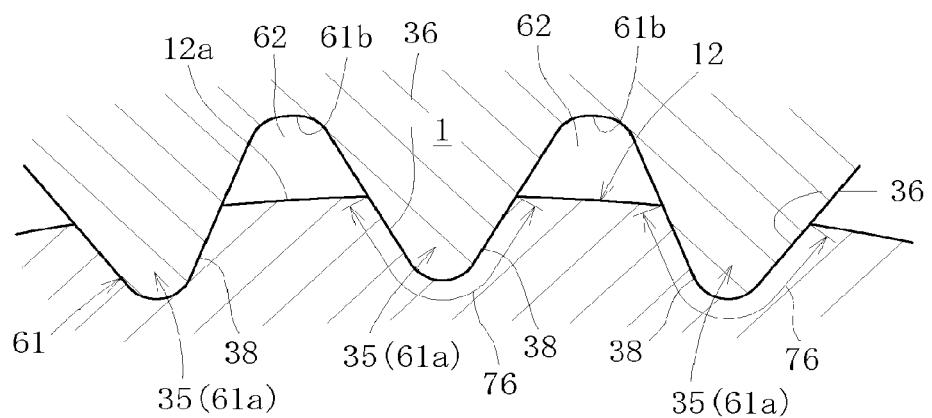
FIG. 21B is an enlarged view of a Y section of FIG. 21A.
Figure 22:
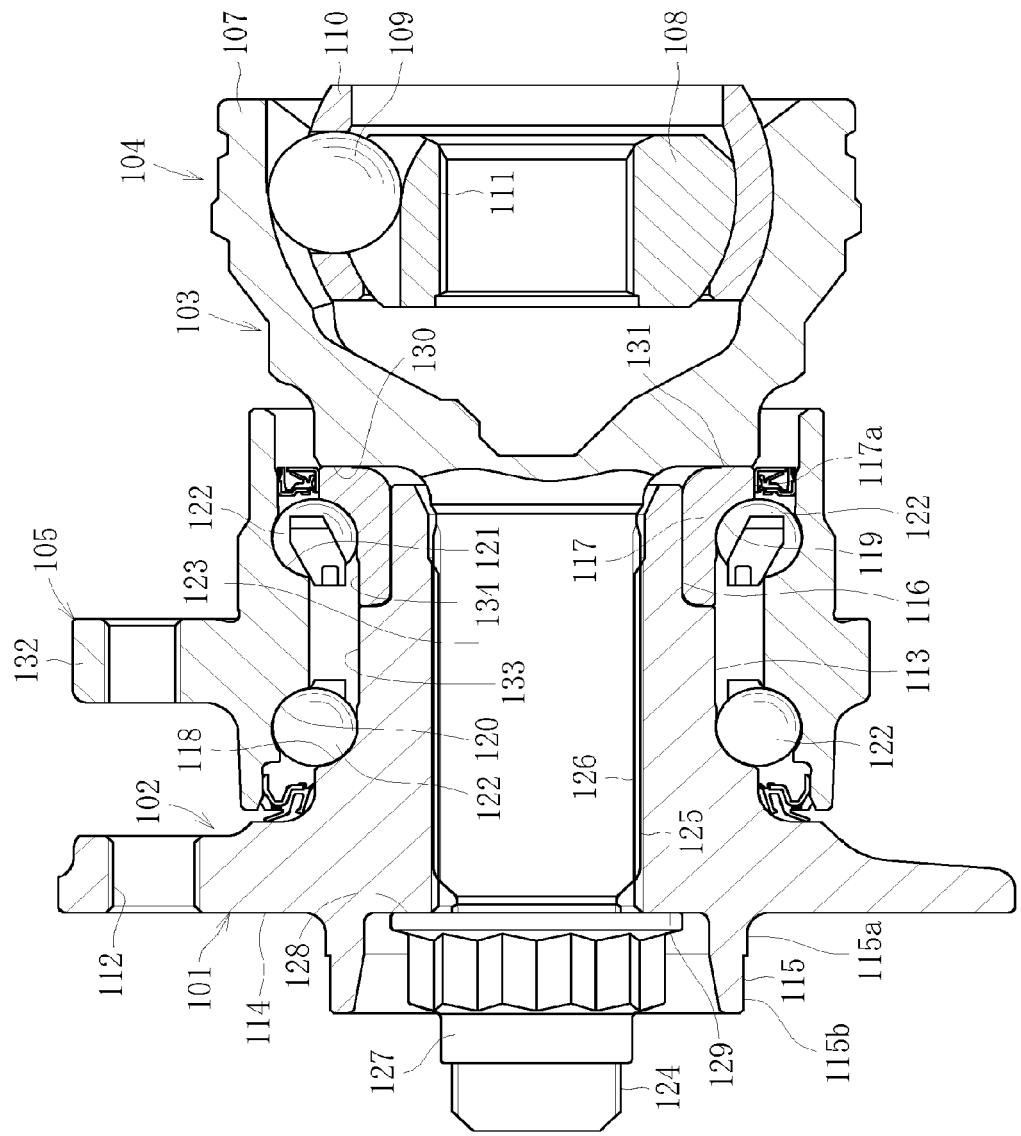
FIG. 22 is a sectional view of a conventional bearing device for a wheel.

Here, the fitting contact regions 38 are ranges 76 illustrated in FIG. 21B and ranges from halfway sections to the tops of the ridges in section of the projections 35. Further, a gap 62 is formed on the outer surface side with respect to the outer circumferential surface of the shaft section 12 between the projections 35 adjacent to each other in the circumferential direction.

As described above, when the projections 35 of the recess-projection fitting structure M are provided on the inner surface 37 of the hole 22 of the hub wheel 1, it is unnecessary to perform hardness treatment (heat treatment) on the shaft section 12 side. Therefore, the outer race 5 of the constant velocity universal joint 3 is excellent in productivity.

Even in this case, the extruded portion 45 is formed by press-fitting. Therefore, it is preferred to provide the pocket section 50 that stores this extruded portion 45. The extruded portion 45 is formed on the mouth side of the shaft section 12, and hence the pocket section is provided on the hub wheel 1 side.

Note that, even in the bearing device for a wheel in which the projections 35 of the recess-projection fitting structure M are formed on the hub wheel 1 side as described above, a shaft extended section having the outer diameter dimension for centering when being press-fitted to the hub wheel 1 may be provided at the end portion on the opposite mouth side of the shaft section 12.

In the above description, the embodiments of the present invention are described. However, the present invention is not limited to the embodiments and various modifications of the embodiments are possible. For example, the shape of the projections 35 of the recess-projection fitting structure M is triangular in section in the embodiment illustrated in FIG. 2 and is trapezoidal in section in the embodiment illustrated in FIG. 4. Besides, projections of various shapes such as a semi-circular shape, a semi-elliptical shape, and a rectangular shape can be adopted. An area, the number, and a circumferential direction arranging pitch, and the like of the projections 35 can also be arbitrarily changed. In other words, it is unnecessary to form the spline 41 or 61 and form the projections (projected teeth) 41a or 61a of this spline 41 or 61 as the projections 35 of the recess-projection fitting structure M. The projections 35 may be something like keys or may form wavy mating surfaces of a curved line shape. In short, it is sufficient that the projections 35 arranged along the axial direction are press-fitted into the opposite side, the recesses 36 adhering to and fitting on the projections 35 can be formed on the opposite side by the projections 35, the entire fitting contact regions 38 of the projections 35 and the recesses that fit on the projections 35 are brought into intimate contact with each other, and rotation torque can be transmitted between the hub wheel 1 and the constant velocity universal joint 3.

Further, the hole 22 of the hub wheel 1 may be a deformed-shape hole such as a polygonal hole other than a circular hole. A sectional shape of the end portion of the shaft section 12 fit and inserted into this hole 22 may be a deformed-shape section such as a polygon section other than a circular section. Moreover, when the shaft section 12 is press-fitted into the hub wheel 1, it is sufficient that only press-fitting start end portions of the projections 35 have hardness higher than that of the regions where the recesses 36 are formed. Therefore, it is unnecessary to set the hardness of the entire projections 35 high. In FIG. 2 and the like, the gap 40 is formed. However, the projections 35 may bite in the inner surface 37 of the hub wheel 1 up to the recesses among the projections 35. Note that, as a hardness difference between the projections 35 side and the side of the recess formation surface formed by the projections 35, as described above, it is preferred to set the hardness difference to be equal to or larger than 30 points in HRC. As long as the projections 35 can be press-fitted, the hardness difference may be smaller than 30 points.

The end surfaces (press-fitting start ends) of the projections 35 are the surfaces orthogonal to the axial direction in the embodiments. However, the end surfaces may be surfaces tilting at a predetermined angle with respect to the axial direction. In this case, the end surfaces may tilt to the opposite projection side from the inner surface side to the outer surface side or may tilt to the projection side.

Further, in the embodiments, regarding the shape of the pocket section 50, in its circumferential groove 51, the side surface 51b on an opposite spline side is a tapered surface that expands in diameter from the groove bottom 51c to the opposite spline side. However, the pocket section 50 may not have the above-mentioned tapered surface. In short, the shape of the pocket section 50 only has to be a shape that can store (house) the extruded portion 45 to be caused. Therefore, a volume of the pocket section 50 only has to be capable of storing the extruded portion 45 to be caused.

When the serrate portions 55 are provided, the serrate portions 55 are provided in the axial end portion (on pocket section side) of the spline 41 in FIG. 8. However, the serrate portions 55 may be provided on the mouth section 11 side opposite thereto, in the axial intermediate section of the spline 41, and in addition, over the entire axial length of the spline 41. Further, the number, the shape, and the like of the projections (projected teeth) 55a of each of the serrate portions 55 can be arbitrarily changed. The serrate portions 55 may be provided on all projections 35 on the circumference, or may be provided on arbitrary projections 35 of all the projections 35 on the circumference. Note that, in the embodiments, the serrate portions 55 are provided on the projections 41a of the spline 41 constituting the projections 35. However, the serrate portions 55 may be provided in the recesses 41b of the spline 41.

Note that, when press-fitting the projections 35, a member on which the projections 35 are formed may be moved, with a member in which the recesses 36 are formed being stationary. Conversely, the member in which the recesses 36 are formed may be moved, with the member on which the projections 35 are formed being stationary. Both of them may be moved. Further, as the rolling elements 30 of the roller bearing 2, rollers may be used. In the constant velocity universal joint 3, the inner race 6 and the shaft 10 may be integrated with each other through an intermediation of the recess-projection fitting structure M described in each of the embodiments.

INDUSTRIAL APPLICABILITY

The present invention can be applied to bearing devices for a wheel of third generation having a structure in which one of inner raceway surfaces of a double-row roller bearing is integrally formed with an outer circumference of a hub wheel integrally having a wheel attachment flange, and fourth generation in which a constant velocity universal joint is integrated with the hub wheel and the other inner raceway surface of the double-row roller bearing is integrally formed with an outer circumference of an outer joint member constituting the constant velocity universal joint.

REFERENCE SIGNS LIST 1 hub wheel
2 roller bearing
3 constant velocity universal joint
11 mouth section
1 shaft portion
22 hole
22a shaft section fitting hole
24 inner race
31 caulked section
35 projection
36 recess
38 fitting contact region
45 extruded portion
50 pocket section
55 recess-projection portion (serrate portion)
H hardened layer
H1 hardened layer
M recess-projection fitting structure

The invention claimed is:

1. A manufacturing method for a bearing device for a wheel, the bearing device comprising:
    a bearing; and
    an outer joint member having a shaft section, wherein
    the bearing comprises an outer member having double-row outer raceway surfaces, an inner member having double-row inner raceway surfaces, and rolling elements in double rows interposed between the double-row outer raceway surfaces of the outer member and the double-row inner raceway surfaces of the inner member,
    the inner member has a hub wheel having a hole and a flange for attachment to a wheel,
    the shaft section of the outer joint member is inserted in a fitting manner into the hole of the hub wheel and is coupled to the hub wheel,
    the manufacturing method comprising steps of:
    providing a projection with an outer diameter surface of the shaft section of the outer joint member, the projection being extended axially;
    providing a small recess with an inner diameter surface of the hub wheel; and
    forming a recess in the hole of the hub wheel by cutting the small recess by the projection press-fitted into the small recess along an axial direction, to thereby form a recess-projection fitting structure in which the projection and the recess are held in close contact with each other over an entire region of fitting contact regions therebetween.

* * * * *